(12) United States Patent
Rutland

(10) Patent No.: US 9,387,746 B2
(45) Date of Patent: Jul. 12, 2016

(54) DOOR SYSTEM, KIT FOR DOOR SYSTEM, AND CANOPY WITH STORAGE SPACE

(71) Applicant: Mark A. Rutland, Jacksonville, FL (US)

(72) Inventor: Mark A. Rutland, Jacksonville, FL (US)

( * ) Notice: Subject to any disclaimer, the term of this patent is extended or adjusted under 35 U.S.C. 154(b) by 0 days.

(21) Appl. No.: 14/357,128

(22) PCT Filed: Feb. 22, 2013

(86) PCT No.: PCT/US2013/027352
§ 371 (c)(1),
(2) Date: May 8, 2014

(87) PCT Pub. No.: WO2013/126722
PCT Pub. Date: Aug. 29, 2013

(65) Prior Publication Data
US 2015/0001872 A1 Jan. 1, 2015

Related U.S. Application Data

(60) Provisional application No. 61/602,299, filed on Feb. 23, 2012.

(51) Int. Cl.
*B60J 5/04* (2006.01)
*B60J 11/06* (2006.01)
*B62D 25/06* (2006.01)

(52) U.S. Cl.
CPC .............. *B60J 5/0487* (2013.01); *B60J 5/0476* (2013.01); *B60J 11/06* (2013.01); *B62D 25/06* (2013.01)

(58) Field of Classification Search
CPC ............ B60J 1/085; B60J 5/04; B60J 5/0401; B60J 5/0408; B60J 5/0412; B60J 5/0476; B60J 5/0484; B60J 5/0487; B60J 7/08; B60J 11/06

USPC ........ 296/79, 146.5, 146.13, 147, 148, 181.7, 296/190.01, 190.03, 190.04, 190.05, 296/190.08, 190.11
See application file for complete search history.

(56) References Cited

U.S. PATENT DOCUMENTS

| | | | | |
|---|---|---|---|---|
| 2,460,399 | A * | 2/1949 | Schassberger | 296/148 |
| 2,682,427 | A * | 6/1954 | Bright | 296/148 |
| 4,518,195 | A * | 5/1985 | Tindall et al. | 296/148 |
| 4,621,859 | A | 11/1986 | Spicher | |
| 5,393,118 | A | 2/1995 | Welborn | |
| 6,206,447 | B1 * | 3/2001 | Nation | 296/77.1 |
| 6,276,745 | B1 * | 8/2001 | Wilson | 296/155 |
| 6,547,304 | B1 | 4/2003 | Conner et al. | |
| 6,776,445 | B1 | 8/2004 | Connor et al. | |
| 6,886,881 | B1 * | 5/2005 | Henderson et al. | 296/146.2 |

(Continued)

OTHER PUBLICATIONS

NPL documnet Golf Cart Trader (www.golfcarttrader.com/enclosures_/door_enclosures.htm) as existed on Dec. 3, 2011; retreived via the Internet Archive Wayback Machine on Oct. 22, 2015.*

(Continued)

*Primary Examiner* — Jason S Daniels
(74) *Attorney, Agent, or Firm* — Greenblum & Bernstein, P.L.C.

(57) ABSTRACT

A door system, kit, and canopy for a vehicle. The door system includes a door 1 formed by a door frame and a skin extending over the door frame. A connection element is couplable to the door 1 to removably attach door 1 to a frame of the vehicle. Door 1 is dimensioned so that, when removed from the vehicle frame, door 1 is stowable one of under and within a canopy of the vehicle.

5 Claims, 24 Drawing Sheets

(56) References Cited

U.S. PATENT DOCUMENTS

2004/0061356 A1 4/2004 Martini
2006/0181102 A1 8/2006 Lemieux
2011/0233957 A1 9/2011 Sams

OTHER PUBLICATIONS

International Search Report dated May 3, 2013.
International Preliminary Report on Patentability and Written Opinion dated Apr. 4, 2013.

* cited by examiner

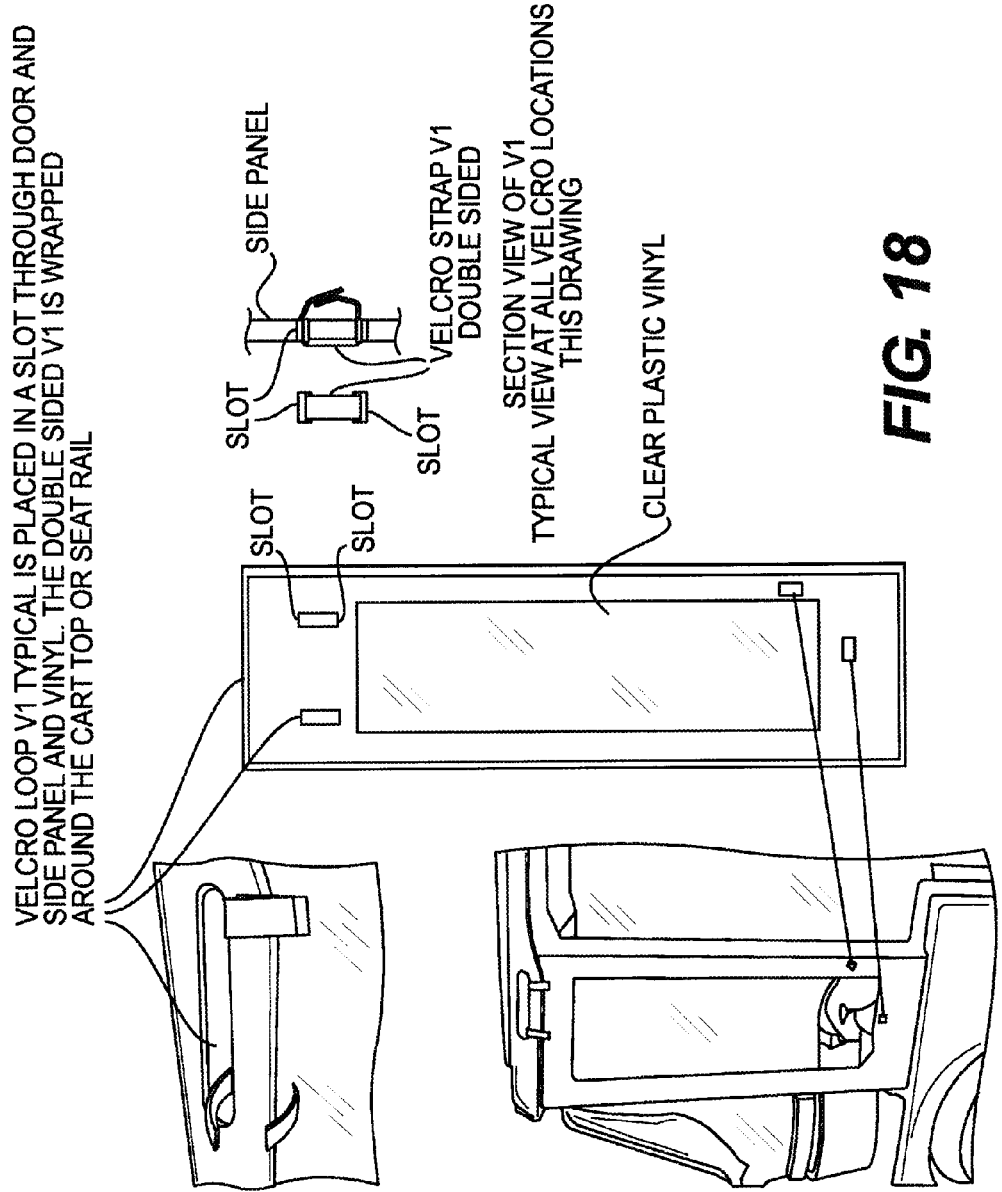

Snap on Hinge D

DOOR SYSTEM, KIT FOR DOOR SYSTEM, AND CANOPY WITH STORAGE SPACE

CROSS-REFERENCE TO RELATED APPLICATION

The instant application claims the benefit of U.S. Provisional Application No. 61/602,299 filed Feb. 23, 2012, the disclosure of which is expressly incorporated by reference herein in its entirety.

BACKGROUND OF THE INVENTION

1. Field of the Invention

Embodiments of the invention are directed to removably attachable doors for an open vehicle, such as a golf cart, all-terrain vehicle (ATV), utility vehicle, cart, etc.

2. Discussion of Background Information

U.S. Pat. No. 4,621,859 to SPICHER is directed to a method of attaching a weathershield to a vehicle. The weathershield is designed as a shroud to cover the front and rear portions of the vehicle, with openings on the sides to receive doors. The doors are affixed to the frame of the vehicle via hinges having a removable pin. The disclosure of this document is expressly incorporated by reference herein in its entirety.

U.S. Pat. No. 5,393,118 to WELBORN is directed to a framed enclosure for vehicles. Doors, formed by plastic sheet over a tubular frame, are affixed to the vehicle. For changing weather conditions, a zipper is arranged at the top of the door so that the plastic sheet at the top of the frame can be separated from the frame in order to partially open the enclosure. The disclosure of this document is expressly incorporated by reference herein in its entirety.

U.S. Pat. No. 6,776,445 to CONNOR et al. is directed to a vehicle cover attached to the vehicle's frame. The cover includes at least one removable framed door. The disclosure of this document is expressly incorporated by reference herein in its entirety.

SUMMARY OF THE EMBODIMENTS

Embodiments of the invention are directed to removably attachable doors for an open vehicle, which can be placed on the vehicle in the event of inclement weather for protection of the riders and which can be removed and stored in the vehicle.

Other embodiments are directed to kits for making an open vehicle door in accordance with the features of the invention. In particular, the kits allow a user to make a door dimensioned for a preselected open vehicle manufacturer, such as a vehicle. The kit can include frame pieces for forming a door frame, a weather-resistant or weatherproof material to be arranged on the door frame, and connectors to pivotably or swivelably connect the doors to the frame of the vehicle. The kit can also include hardware for connecting the frame pieces together. In other embodiments, the ends of certain frame pieces can be formed for insertion into adjacent pieces. In still further embodiments, an elastic cord can be provided within some or all of the frame pieces to facilitate quick assembly and disassembly of the door frame and to prevent frame pieces from being lost.

Additionally, removably attachable side panels can be provided for additional inclement weather protection.

Further, the removed doors can be stowed under the vehicle's canopy.

In still further embodiments, a storage canopy can be provided that includes at least one storage space structured to receive the doors when not in use on the vehicle. In particular, embodiments, the side panels can be stowed with the doors in the storage space. The storage canopy can provided with connection elements that are located in positions that correspond to connection elements for mounting the vehicle's original canopy to the vehicle frame. This allows the user to retrofit their vehicle with the storage canopy in lieu of the original canopy.

Embodiments of the invention are directed to a door system for a vehicle. The door system includes a door frame formed by at least one framing member, a skin extending across the door frame and a connection element coupled to the door frame to removably attach the door frame to a frame of the vehicle. The door frame is dimensioned so that, when removed from the vehicle frame, the door frame stowable one of under and within a canopy of the vehicle.

According to embodiments of the instant invention, the at least one framing member can include a plurality of profiled elements. The plurality of profiled elements may include at least one of flat panels, rods, and tubes.

Further, the connection element can include at least one of a clip, clamp or bracket structured for removable attachment to a frame of the vehicle. The connection element may further include a channel structured and arranged to receive and retain at least a part of the door frame. Moreover, a pin can be coupled to the door frame, and the connection element can further include a channel structured and arranged to receive and retain the pin. The connection element can further include two coaxial channels structured and arranged to receive and retain the pin, and the two coaxial channels may have openings for receiving the pin that are not aligned in an axial direction. Further, a diagonal channel can be formed between the two coaxial channels.

In accordance with other embodiments, the door frame can include at least one hinge structured and arranged to fold the constructed door frame. In still other embodiments, the frame can be enveloped by at least part of the skin. Further, the skin can be connected to the frame. According to further embodiments, the skin can be surrounded by a window frame that is structured and arranged for connection to the door frame.

According to further embodiments, a side panel can be structured for attachment to the vehicle adjacent an edge of the door frame to extend lateral coverage of the vehicle.

Embodiments of the instant application are directed to a door system kit for a vehicle. The door system kit includes a plurality of frame pieces being connectable to one another for forming a door frame, a skin structured and arranged to be extended over and attach at least one of to and around the door frame and connection elements couplable to the door frame and to the vehicle frame, the connection element being removably attachable to each other. The door frame is dimensioned to be stowable one of under and within a canopy of the vehicle.

Embodiments of the invention are directed to a canopy for a vehicle. The canopy includes an upper surface, a lower surface structured and arranged to face an interior of the vehicle and at least one storage space formed between the upper and lower surfaces.

According to embodiments, the at least one storage space can include at least two separated storage areas.

In accordance with still yet other embodiments of the present invention, the at least one storage space can be dimensioned to accommodate receipt of removable doors of the vehicle.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 18 shows an embodiment of the side panel;

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

According to embodiments of the invention, the vehicle doors are designed to:
  Produce a removable light weight door;
  Allow storage of the doors under the canopy of the cart;
  Avoid the need for zippers for ingress to or egress from the cart and/or for providing fresh air after inclement weather has ended; and
  Provide a simple yet be cost effective design.

Moreover, it is contemplated that the doors can be manufactured and sold in completed form with hardware for attaching the doors to a vehicle. It is understood that, as the dimensions of vehicle vary from manufacturer to manufacturer, the dimensions of the manufactured doors would likewise vary depending upon which manufacturer's vehicle the door was to be removably attached. Manufacturers for whose vehicles doors can be provided in accordance with embodiments of the invention include, but are not limited to, EZ-GO, Club Car, Yamaha, John Deere, etc.

Figure 1:
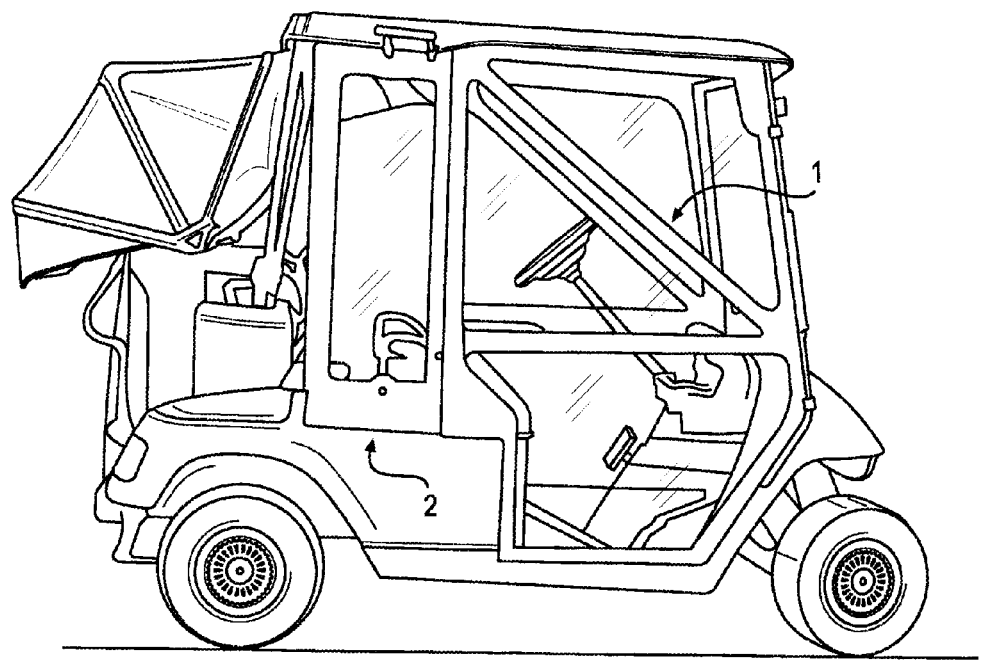
FIG. 1 illustrates a side view of an open vehicle with a vehicle door and a side panel attached in accordance with embodiments of the invention.

As illustrated in FIG. 1, an open vehicle, such as a golf cart, all-terrain vehicle (ATV), utility vehicle, cart, etc., can be provided with removable and stowable doors 1 and side panels 2 or a kit can be provided to retrofit a vehicle with removable and stowable doors 1 and a side panel 2 for attachment to a vehicle. In the embodiment depicted in FIG. 2, the door frame can be formed by a plurality pieces, e.g., hollow tubes, solid bars and/or combinations thereof, and can be made of metal, such as stainless steel or aluminum, plastic, polyvinyl-chloride, or of composite materials such as fiberglass, polycarbonate or other suitable materials that will maintain the desired shape yet remain lightweight. By way of non-limiting example, the frame pieces can be made of ¼" diameter stainless steel rod that is shaped and welded into a shape dimensioned for a predetermined vehicle model. At least one cross-piece can be attached to provide strength and stability to the door frame. Still further, a diagonal cross-piece can also be attached to provide strength and stability to the door frame. Of course, it is understood that other diameters and geometries can be utilized as the frame pieces as long as the resulting door frame has the requisite strength to maintain its shape, stability, and function.

Figure 3:
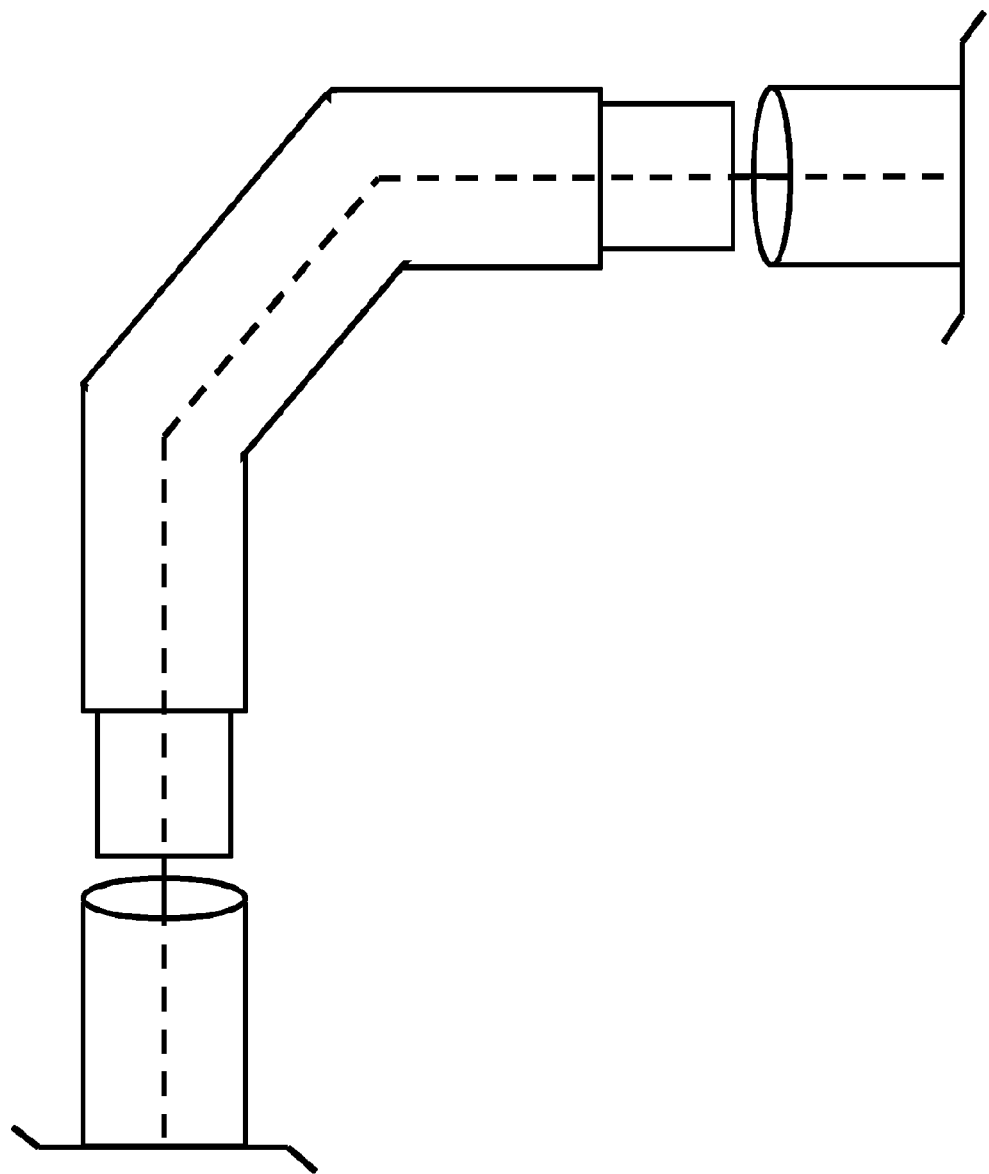
FIG. 3 illustrates a further embodiment of the frame for the vehicle door kit.

Further, in embodiments, when the door frame is part of a kit that can be assembled by a consumer, see, e.g., the non-limiting embodiments in FIG. 3, the kit can include a number of bent tubular and/or rod sections constructed from materials including metal, plastic, other rigid material, and/or combinations thereof having ends formed for insertion into a number of straight pieces or for ends of the straight pieces to be inserted into the bent sections. In other embodiments, e.g., as also depicted in FIG. 3, an elastic cord can be provided to extend through the various pieces to facilitate the construction of the frame. Further, the cross-piece(s) can be a single piece or multiple pieces, and can be separate from the disassembled kit pieces of the frame or pivotably connected to one or more frame pieces and connected to provide the desired strength and stability to the frame.

Figure 4:
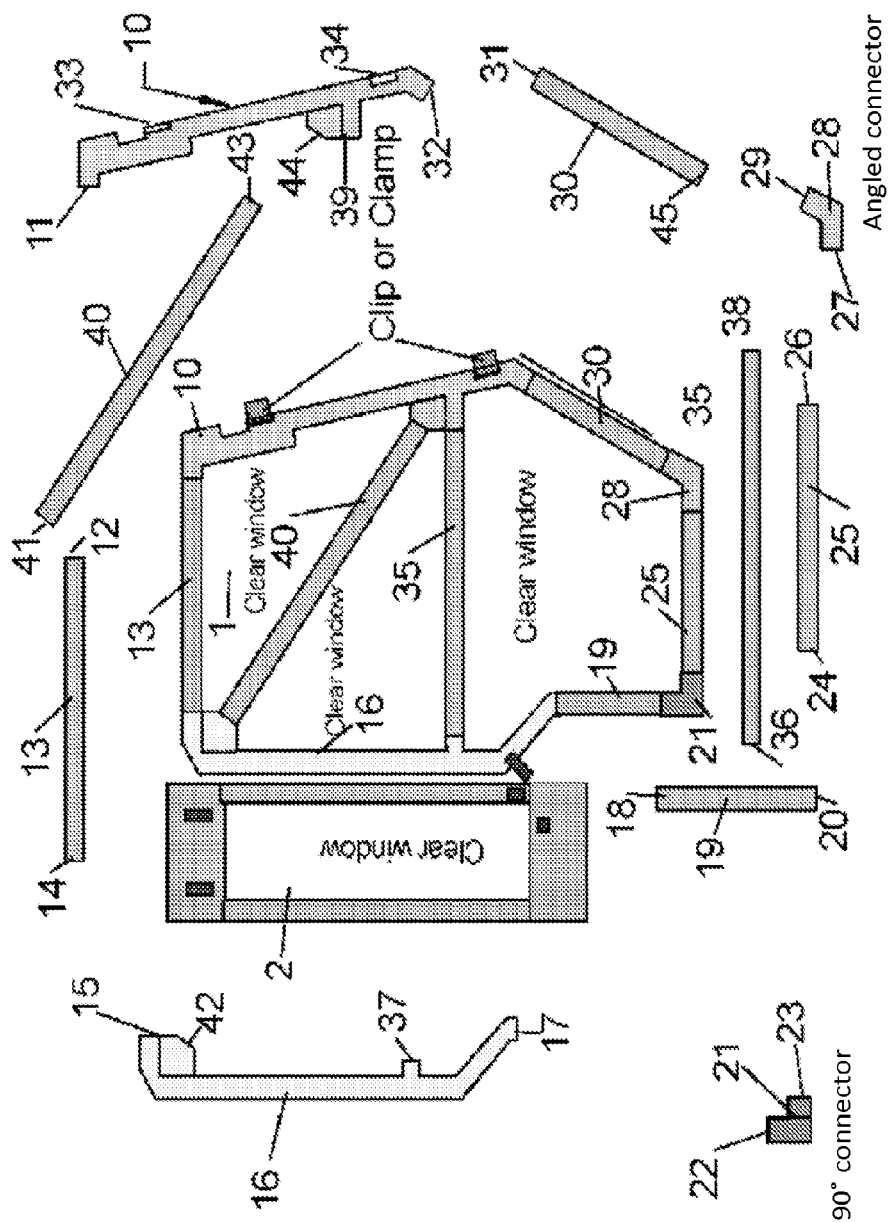
FIG. 4 shows an alternative embodiment of a frame for the vehicle door kit.

In another embodiment depicted, e.g., in FIG. 4, the plurality of pieces for forming the door frame can be generally flat interconnectable panels of plastic, PVC, polycarbonate, fiberglass or other suitable material, and connectors. The flat panels can be solid, hollow or a combination of solid and hollow. Further, hollow portions of the flat panels can include trusses or braces for adding rigidity and stability to the individual panel and to the constructed frame. Moreover, FIG. 4 shows an embodiment of a door frame 1 constructed from the interconnectable panels surrounded by an exploded view of the generally flat panel door frame embodiment. In this embodiment, a bearing panel 10 is structured for pivotable connection to the vehicle frame. At an end of bearing panel 10 a connector 11 can be attached or unitarily formed to receive an end 12 of a top horizontal panel 13. An other end 14 of top horizontal panel 13 can be received in a connector 15 coupled to or unitarily formed at an end of a vertical top panel 16. A connector 17 coupled to or unitarily formed at another end of vertical top panel 16 can be connected to an end 18 of a vertical bottom panel 19. An L-shaped connector 21 can include an end 22 connectable to an other end of vertical bottom panel 19 and an end 23 connectable to an end 24 of a bottom horizontal panel 25. An angled or V-shaped connector 28 can include an end 27 connectable to an other end 26 of horizontal bottom panel 25 and an end 29 connectable to an end 45 of a bottom diagonal panel 30. An other end 31 of bottom diagonal panel 30 can be coupled to a connector 32 attached to or integral with a bottom end of bearing panel 10.

Bearing panel 10 can also include pins 33 and 34, which can be integrally formed with bearing panel 10 or can be inserted into bearing panel 10. Further, in embodiments, a horizontal support panel 35 can include an end 36 connectable to a connector 37 coupled to or integrally formed with top vertical panel 16 and an other end 38 connectable to a connector 39 coupled to or integrally formed with bearing panel 10. In other embodiments, a diagonal support panel 40 can include an end 41 connectable to a connector 42 coupled to or integrally formed with top vertical panel 16 and an other end 43 connectable to a connector 44 coupled to or integrally formed with bearing panel 10. The panels forming the door frame can be between 0.2 and 0.4 inches in thickness, and the overall dimensions of the door frame are selected to fit the opening for the particular vehicle to which it will be attached. By way of non-limiting example, when the vehicle is a golf cart, the constructed frame can have a vertical length of 52 to 57 inches, preferably about 55 inches, a widest width of 37 to 41 inches, preferably about 39 inches, a top width of 30 to 35 inches, preferably about 32.5 inches, and a bottom width of 21 to 25 inches, preferably about 23.5 inches.

In embodiments, the straight pieces 13, 19, 25, 30, 35 and 40 in FIG. 4 can be formed with a predetermined longest length required and then cut to fit the need on any vehicle or cart. Moreover, the predetermined longest length of the straight pieces can be provided with printed or embossed guide lines to instruct a user where to cut the pieces for retrofitting the doors to a particular vehicle. Further, the ends of these straight pieces can be male connectors to join in female fittings integrally formed on, e.g., bearing panel 10 and vertical top panel 16. In this manner, all straight pieces can be formed with a single mold. Moreover, it should be understood that, depending upon the specific dimensions of the opening for the vehicle to which the door frames will be attached, the angles of the elbows and the lengths will vary depending upon which model vehicle the kit is intended for use.

Figure 5:
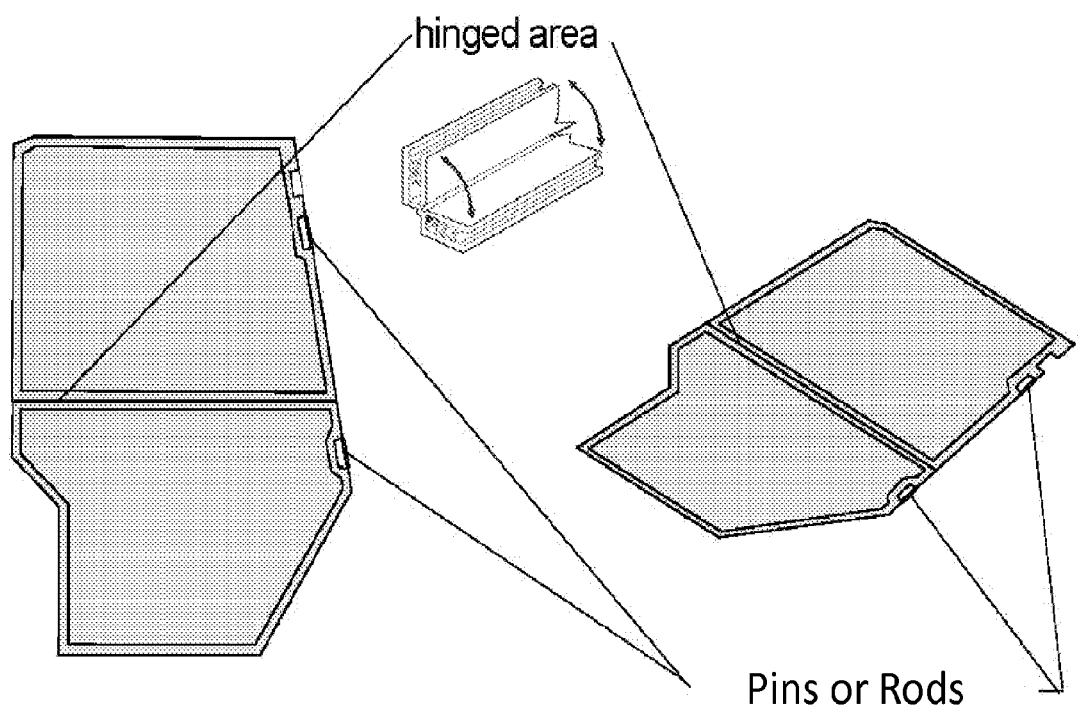
FIG. 5 shows an embodiment in which the vehicle door frame includes a hinged area.

In further embodiments, the constructed door frame can be foldable to reduce space for storage. As shown in FIG. 5, hinges can be formed in the region of the cross beam or horizontal panel. In an alternative embodiment, the horizontal panel can be formed by two hingedly connected panels or the horizontal panel can be formed with a film hinge. In accordance with these embodiments, it is understood that the frame or panel would likewise include oppositely arranged hinges in two of the panels forming the door frame. This can be particularly advantageous for individuals who do not own their own open vehicle, but use such vehicles, e.g., renting a golf cart. Such golfers can easily fold the doors for storage and transport to the golf course and, upon receiving a rented golf cart, can unfold and attach the doors to the rented golf cart for protection from inclement weather and/or the sun.

Figure 6:
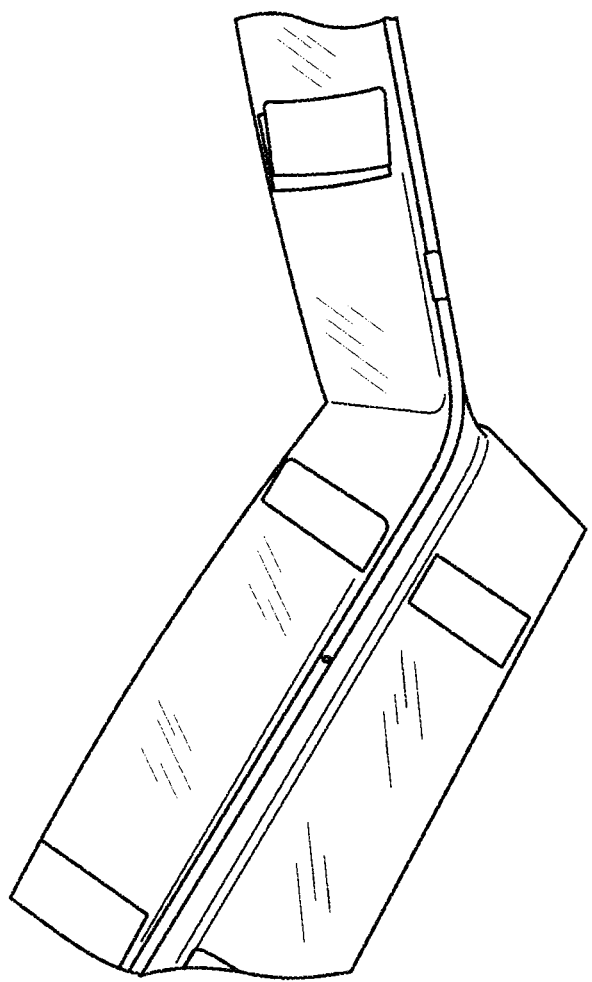
FIG. 6 shows an embodiment of attaching a skin to the vehicle door frame depicted in FIG. 3.
Figure 7:
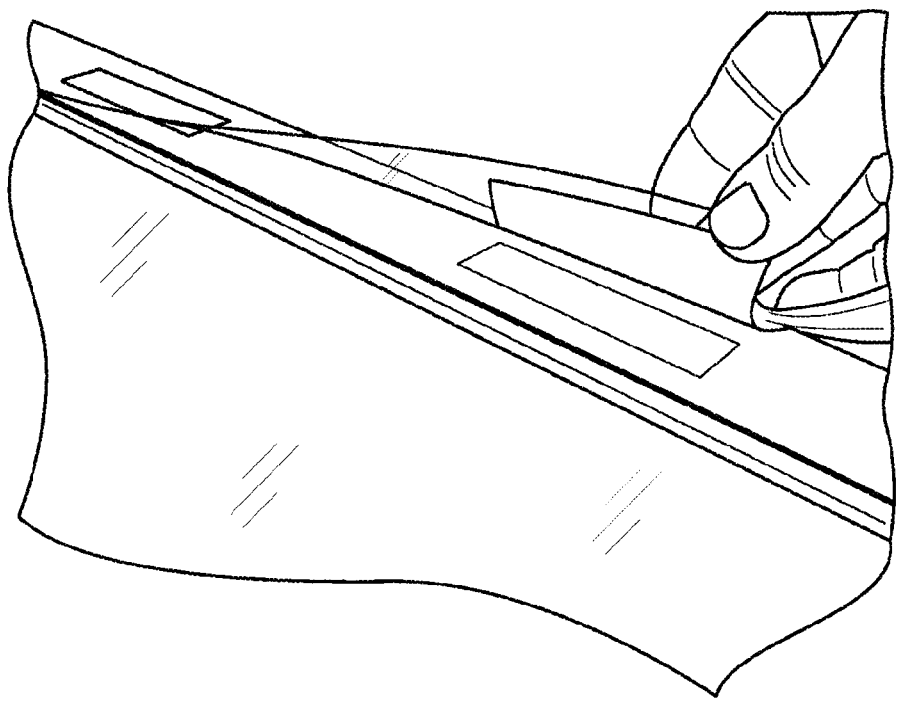
FIG. 7 shows an embodiment of attaching a skin to the vehicle door frame depicted in FIG. 4.

The skin of the door can be formed by a weather-resistant or weatherproof material, such as plastic, vinyl, canvas, or treated fabrics. Preferably, the material is clear so as not to limit visibility. However, it is also contemplated that the skin can be translucent or opaque with a clear plastic or vinyl insert formed as a window. By way of non-limiting example, the skin can be clear vinyl, such as 16 gauge clear vinyl. Moreover, the clear vinyl can be coated or formed with a sun protective tint to reduce sun glare and intensity inside the vehicle. The vinyl material can be cut to fit the door frame with some additional material, e.g., 2.5", remaining to act as an overhang to mount the ends to or on the frame or to wrap the overhang portion around the frame and mount the ends on the skin using any suitable connection, e.g., Velcro, snaps, permanent and semi-permanent adhesive, as shown by way on non-limiting example in FIG. 2. In this regard, part of a ¾" Velcro tape pieces can be attached to ends of the vinyl material, as shown in FIG. 6, and complementary parts of the ¼" Velcro tape pieces can be attached inside the vinyl material in order to surround the frame and attach to each other, thereby securing the skin on the frame. In other embodiments, part of ¾" Velcro tape pieces can be attached to the frame and complementary parts of the ¾" Velcro tape pieces can be attached at edges of the skin, as shown in FIG. 7, in order to connect the skin to the frame. In accordance with these exemplary embodiments, the ends of the skin can be pulled tight over the frame and then connected by the Velcro to maintain the tension.

Figure 8:
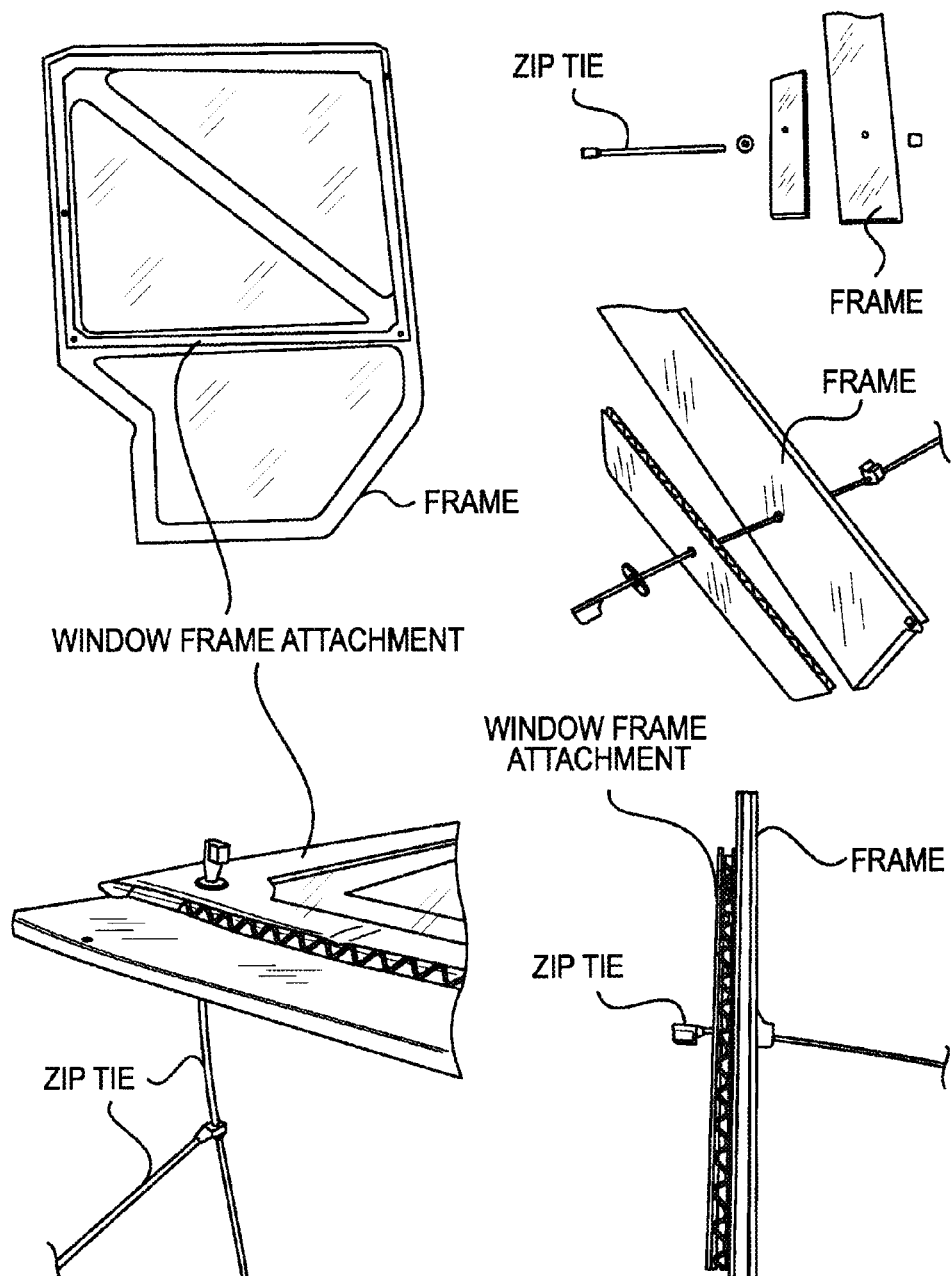
FIG. 8 illustrates an alternative manner for connecting the skin to the vehicle frame.

In other embodiments, the skin can be provided with a window frame attachment to assist in mounting the skin to the frame, particularly to the flat surface of the panel frame. As shown in FIG. 8, skin material can be wrapped around at least edges of a window frame attachment, and the skin and window frame attachment can be placed on or spread out over the door frame, e.g., the panel frame illustrated in FIG. 4. The edges of the skin wrapped around the window frame attachment can be connected to the window frame attachment by Velcro, snaps, glue or other adhesive, friction or ultrasonic welding, or other suitable attachment process. The window frame attachment can include a washer or gusset providing a through opening, through which a zip tie or other similar connector, such as bolts, screws, rivets, etc. can be placed. In other embodiments, window frame attachment can be connected to the frame via snaps, clamps, clips, etc.

Figure 9A:
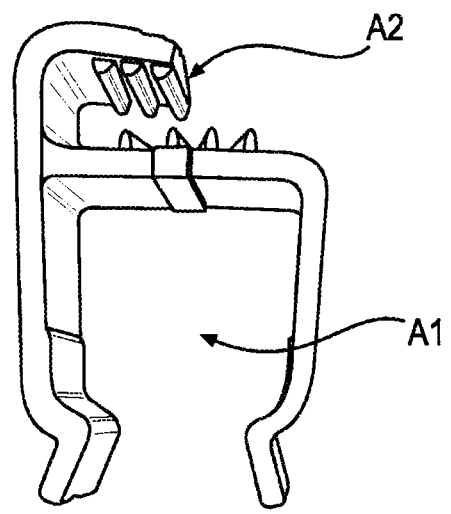
FIG. 9 shows embodiments of U-shaped clips A and B for attaching the vehicle door to the vehicle frame.
Figure 9B:
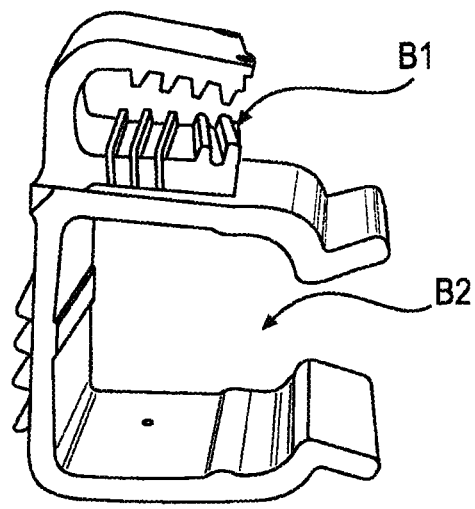
Figure 10:
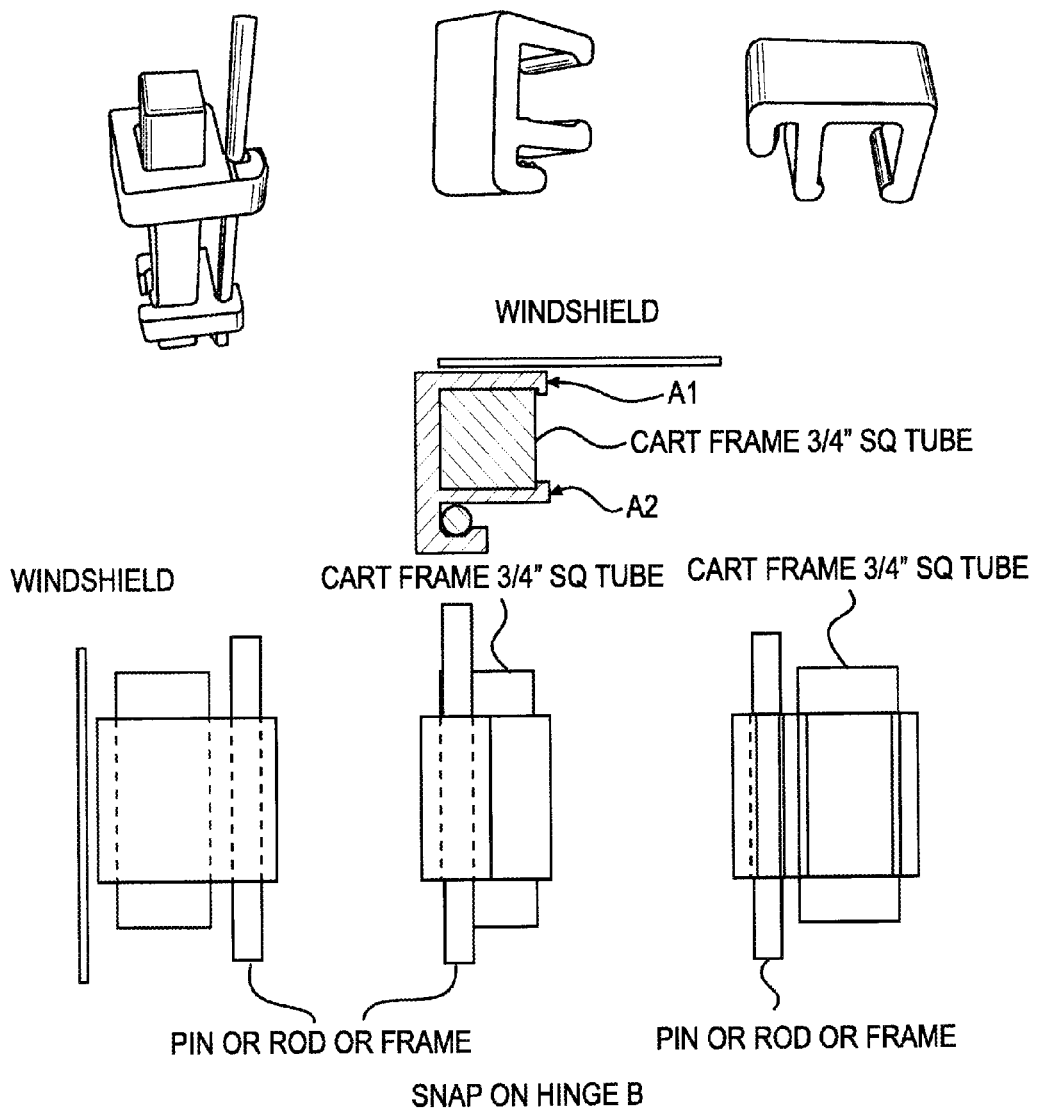
FIG. 10 shows in greater details the attachment of door to the cart frame via the U-shaped clip B depicted in FIG. 9.

The doors can be detachably attached to the vehicle using any suitable connection elements that allow the doors to pivot open and allow the riders to enter and leave the interior of the vehicle, e.g., hinges, clips, etc. By way of non-limiting example, a U-shaped clip can be connected to the frame of the vehicle, e.g., pushed/snapped on for a pressure fit or attached with screws, bolts, nuts, etc. In certain embodiments, it may be advantageous to use additionally secure a pushed/snapped on U-shaped clip with a screw or bolt to avoid any slipping of the clip under weight of the door. In embodiments, the U-shaped clip can be plastic, steel or other material. As shown in FIG. 9, two (2) U-shaped clips designated as "A" and "B" includes a large U-shaped channels A1, B1 structured to surround and attach to the vehicle frame and a smaller U-shaped channel A2, B2 structured to receive a part of the round door frame or a pin attached to or integrally formed with the bearing panel of the door frame. The open end of large U-shaped channel A1 is oriented in a direction approximately 90° from the open end of smaller channel A2. In contrast, the open end of large U-shaped channel B1 is oriented in a same direction from the open end or smaller channel B2. Clips A and B can be used together, i.e., one each to mount the cart door or each cart door can be mounted to the cart frame using the same type of clip. FIG. 10 shows a preferred placement of U-shaped clip B connecting the door frame or pin of the door frame to the vehicle frame. In another embodiment, the large U-shaped channel A1, B1 can be modified to accommodate a round vehicle frame (not shown) without departing from the spirit and scope of the embodiments of invention.

Figure 11:
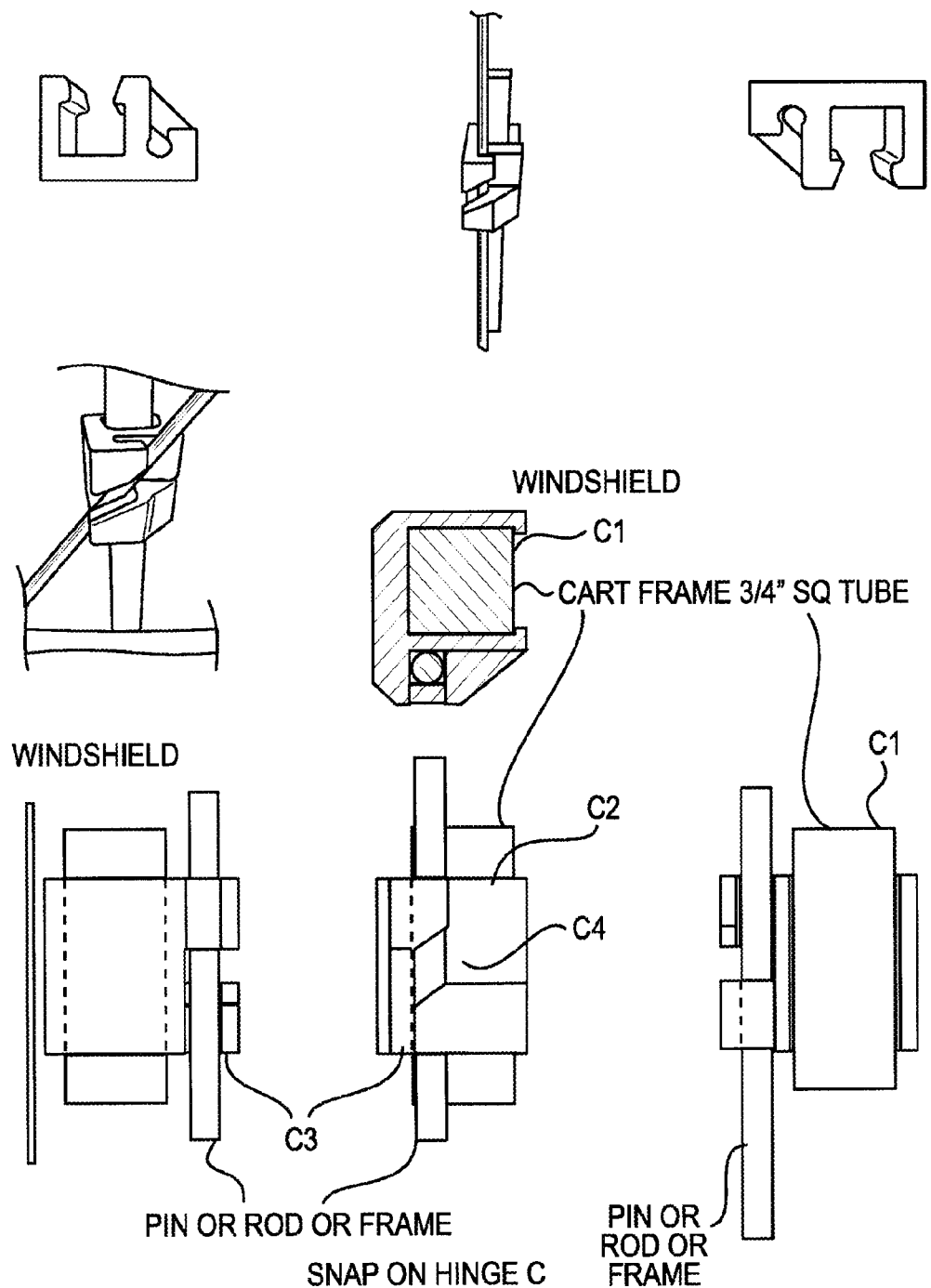
FIG. 11 shows an alternative U-shaped clip for attaching the vehicle door to the vehicle frame.

A further non-limiting example of a clip for connecting the cart door to the cart frame is shown in FIG. 11. In the exemplary embodiment, a U-shaped clip C can also be connected to the frame of the vehicle, e.g., pushed on for a pressure fit or attached with screws, bolts, nuts, etc. In the illustrated embodiment, U-shaped clip C includes a large U-shaped channels C1 structured to surround and attach to the vehicle frame and two (2) smaller U-shaped channels C2, C3 structured to receive a part of the round door frame or a pin attached to or integrally formed with the bearing panel of the door frame. The open end of large U-shaped channel C1 is oriented in a same direction from the open end of smaller channel C2, but is oriented in an opposite direction from the open end of smaller channel C3. Clip channels C2 and C3 are laterally spaced in the direction of the door frame or pin, and a diagonal channel C4 can be formed between channels C2 and C3 to diagonally insert the door frame or pin into diagonal channel C4 and to rotate clip C relative to the door frame or pin so that the door frame or pin is retained within channels C2 and C3. As with the other embodiments of clips, U-shaped channel C1 can be modified to accommodate a round vehicle frame (not shown) without departing from the spirit and scope of the embodiments of invention.

Figure 12:
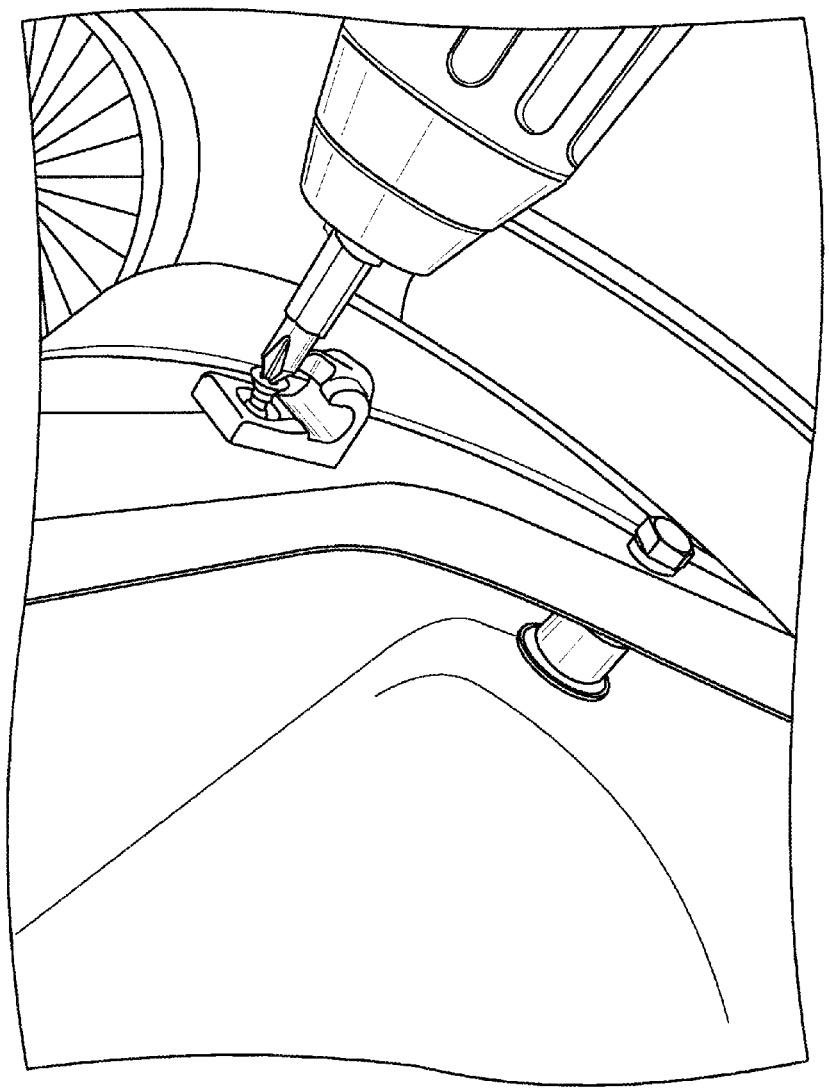
FIG. 12 shows attaching of an alternative connection element to the vehicle frame.
Figure 13:
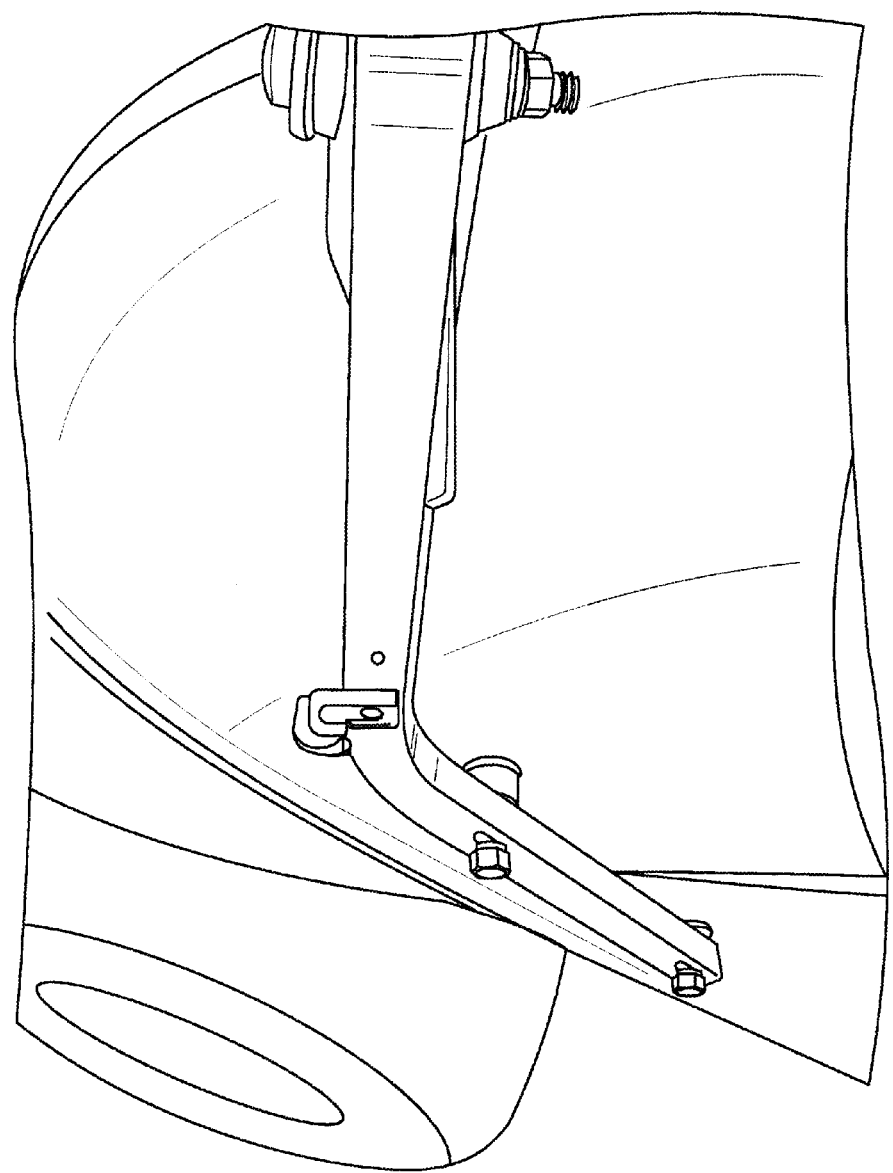
FIG. 13 shows the attachment of the alternative connection element depicted in FIG. 12.

In still other embodiments, a C-shaped clip can be connected to the frame of the vehicle, e.g., using screws, bolts, nuts, etc., see FIGS. 12 and 13 for an example of a screw connection. In embodiments, the C-shaped clip can be a plastic clip commonly used, e.g., in connecting wire shelving. A pin dimensioned to snap into the C-shaped clip can be formed in the door frame or attached thereto. In embodiments, a part of the door frame can be received or snapped into the C-shaped clip in lieu of attaching a pin.

Figure 2:
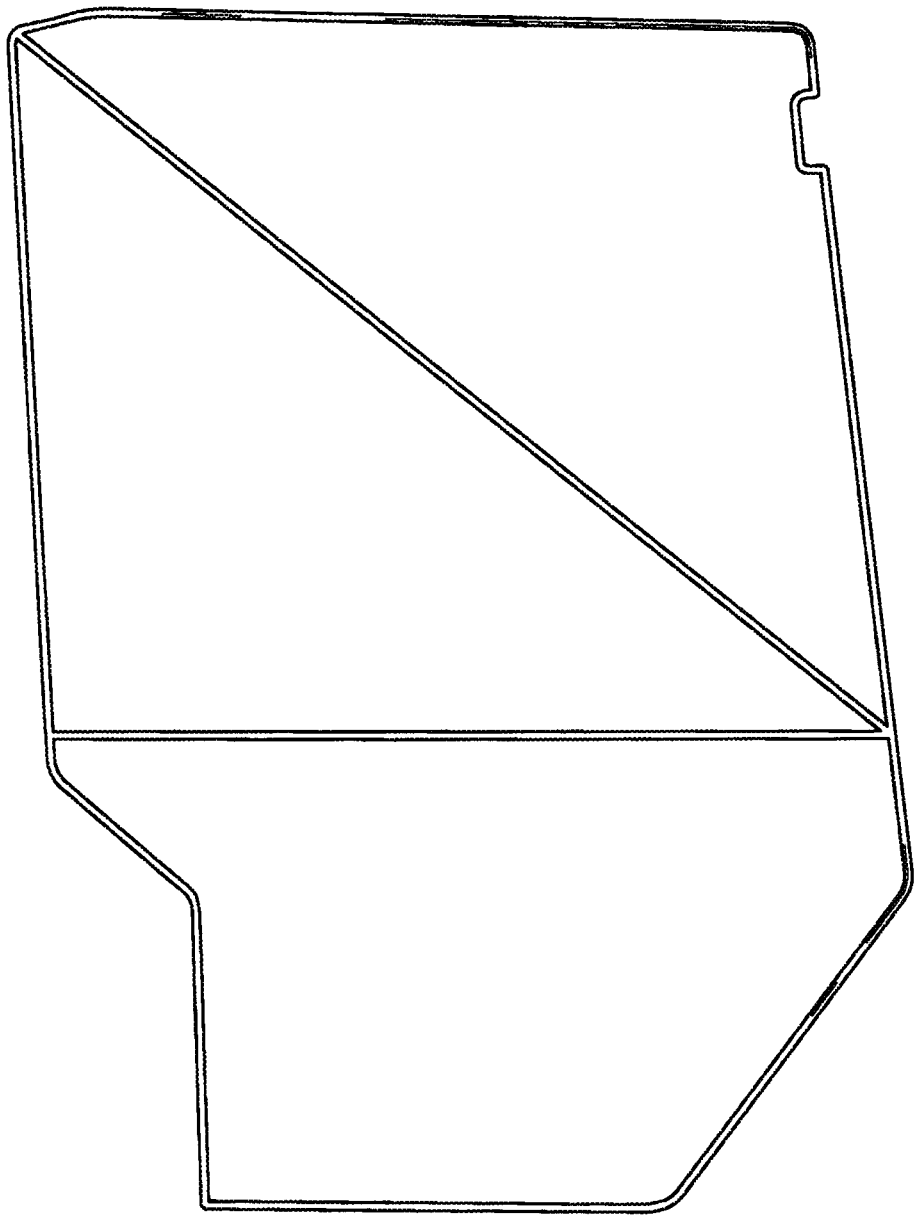
FIG. 2 illustrates an embodiment of a frame for the vehicle door for a vehicle door kit.
Figure 14:
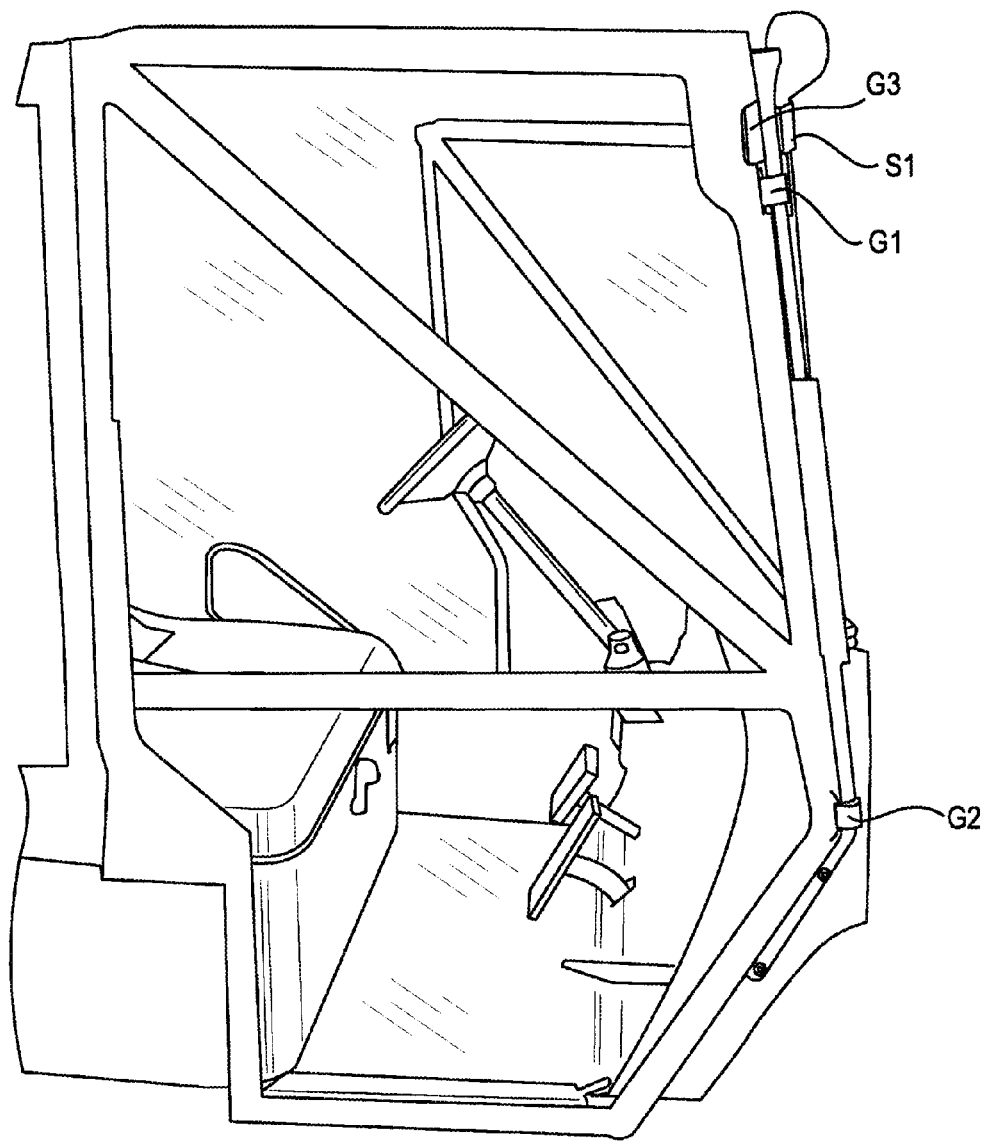
FIG. 14 shows the vehicle door attached to the vehicle frame.
Figure 15:
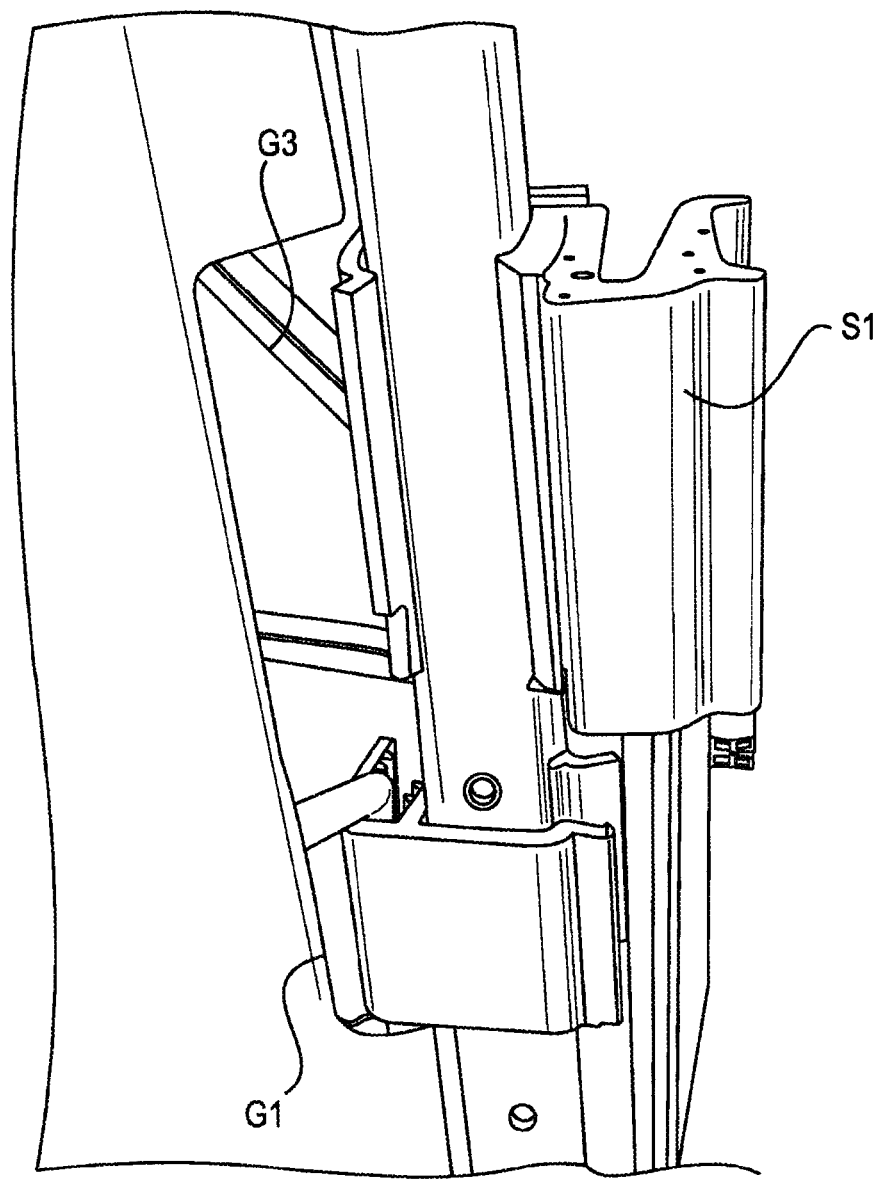
FIG. 15 shows a conventional clamping element used as a stop surface.

As discussed above, a pin or rod dimensioned to be received in the smaller U-shaped channels of the U-shaped clips can be formed in the door frame or attached thereto, as shown, e.g., in FIGS. 2, 4 and 5. In particular embodiments, a part of the door frame can be received or snapped into the smaller U-shaped channel in lieu of attaching a pin. In embodiments, the skin can include cut-out portions in the regions of the pin or rod portion of the door frame to allow the pin or rod portion of the door frame to snap into the smaller U-shaped channel of the clip and to allow the door to pivot in this connection. As shown in FIG. 14, cut-out portions G1, G2 can be formed in the skin to expose the pin or portion of frame for attachment to the clip. FIG. 14 also shows a clamping device S1, which is shown in greater detail in FIG. 15, common on many vehicles for holding the windshield in an upright position. As is generally known, even if the windshield is released and placed in a folded down position, clamping device S1 remains in place on the vehicle frame. Thus, in the exemplary embodiment of FIG. 15, the U-shaped clip can be positioned below clamping device S1 so that an L-shaped portion of the door frame or the bearing panel located above the upper pin or rod can be arranged placed slightly above or on a top of clamping device S1 to provide a stop surface in the event the clips inadvertently slip and/or to provide a bearing surface on which a portion of the door frame or bearing panel can be additionally supported. Further, to accommodate clamping device S1, a further cut-out G3 can be formed above cut-out G1. In still further embodiments, a bearing piece or washer or other element can be added to the door frame, e.g., above clamping device S1 or above the intended location for the upper U-shaped clip (when the vehicle does not include a clamping device S1, to contact the L-shaped portion of the door frame or the bearing panel located above the upper pin or rod to provide a stop surface in the event the clips inadvertently slip and to provide a bearing surface on which this portion of the door frame or bearing panel can be further supported.

Figure 16A:
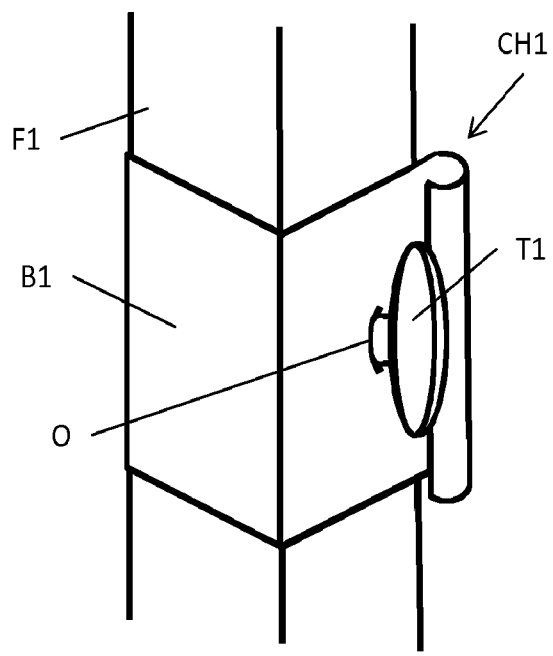
FIGS. 16A and 16B illustrate an embodiment in which a bracket is clamped onto the vehicle frame.
Figure 16B:
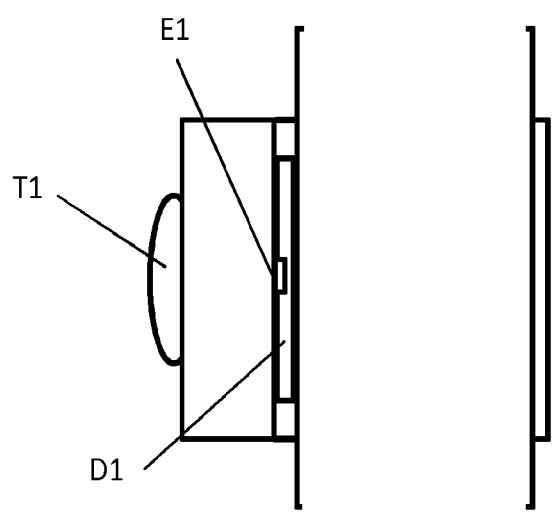

Further, as vehicles are often time rented, it may be advantageous to provide connection elements that are not destructive of the vehicle's frame. In a non-limiting embodiment, a clamp element, e.g., a screw clamp, connectable to the vehicle frame can be positioned below the U-shaped clips to prevent these clips from slipping under the weight of the doors. In a further alternative non-limiting example, a U-shaped bracket B1 can be provided to be clamped onto the vehicle's frame F1. As shown in FIGS. 16A and 16B, bracket B1 can have an opening O to receive a clamping screw T1, e.g., a thumb screw, with a so that the end E1 of the clamping screw T1 will engage the vehicle frame F1 to securely clamp bracket B1 in place on frame F1. Moreover, it is also contemplated that a flat disc or curved contact surface D1 (depending upon the geometry of frame to which the door is to be attached) can be affixed or screwed onto the end E1 of screw T1 to engage the surface of frame F1, whereby a greater clamping can be achieved through a greater contact surface, see FIG. 16B. This may also be advantageous so as to reduce the risk of denting or marring the vehicle frame, which may be a rented cart owned by a golf course or club and not the owner of the removable doors.

Bracket B1 can include a C-shaped channel CH1 to receive a pin or rod attachable to or incorporated in or integral with the door frame. It is further understood that opening O and clamping screw T1 can be located on a side of bracket B1 opposite C-shaped channel CH1 to avoid clamping screw T1 from interfering with the engaging of the pin or rod of the door frame into channel CH1. Bracket B1, channel CH1, and the pin or rod, as discussed above, can be formed of plastic, metal or other suitable material. In this way, the pin will be allowed to freely rotate or pivot within channel CH1. It is preferred that a load bearing portion of the pin or rod is generally supported by the entirety of the channel. Thus, it is also contemplated that channel CH1 can be oriented in the opposite direction or an other direction in order to support surfaces of the pin or rods opposite a direction of the forces exerted by the weight of the doors. Further, channel CH1 can be suitably formed so that the pin snaps into channel CH1, thereby securing the door in place. By way of non-limiting example, channel CH1 can be alternatively be constructed or formed in a manner similar to the above-described smaller U-shaped channel A2, B2 or C2-C4.

Figure 17A:
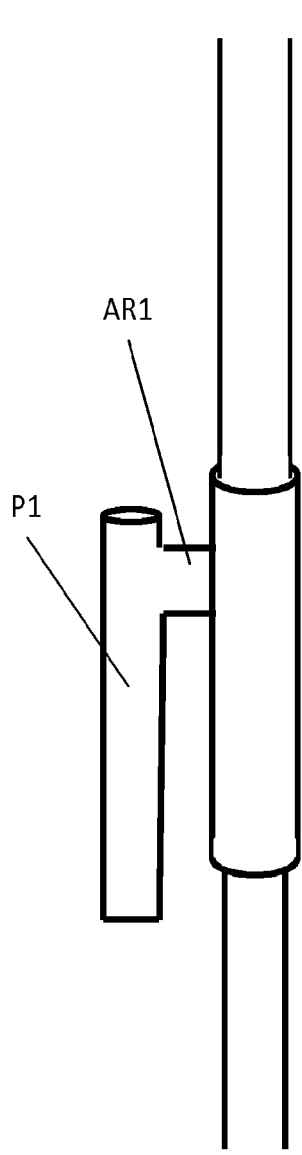
FIGS. 17A and 17B illustrate embodiments of pins for use in combination with the channel depicted in FIG. 10(*a*)
Figure 17B:
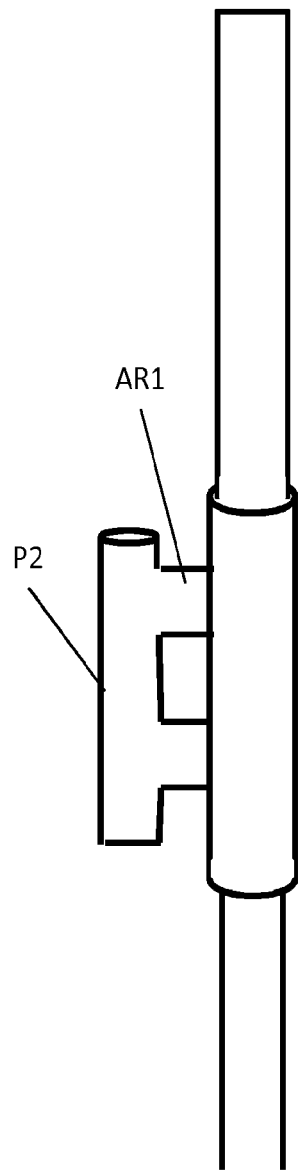

In a further embodiment of the invention illustrated in FIGS. 17A and 17B, the pin or rod P1, P2 can be permanently or removably attached to the door frame via screws, bolts, nuts, adhesive, welding, crimping or other suitable process for use with the above described brackets or clips. In this manner, once the bracket B1 of FIG. 16A is attached to the vehicle's frame F1, the doors can easily be connected by, e.g., snapping the pin P1, P2 into the C-shaped channel CH1 or inserting the pin longitudinally into the channel CH1. Further, a bearing surface (not shown) can be added to the top of the C-shaped channel so that the arms AR1 extending the pin from the door frame or bearing panel can slide over or along this surface. Moreover, a stop can be added to or formed in the C-shaped clamp CH1 and/or U-shaped clips A, B, C to prevent over-rotation or pivoting of the door that may cause the arm AR1 extending the pin to slip off the bearing surface or top of the C-shaped clamp/U-shaped clip. Further, it is understood that, instead of a pin, the C-shaped clamp can be structured to receive the door frame and/or the door frame can be structured at a predetermined point to fit into the C-shaped clamp. Still further, it may be advantageous to include a bearing piece or washer or other element to the door frame to contact a top of the C-shaped clamp to prevent the door frame from slipping too far through the C-shaped clamp, i.e., beyond a predetermined pivot point along the door frame.

Figure 24:
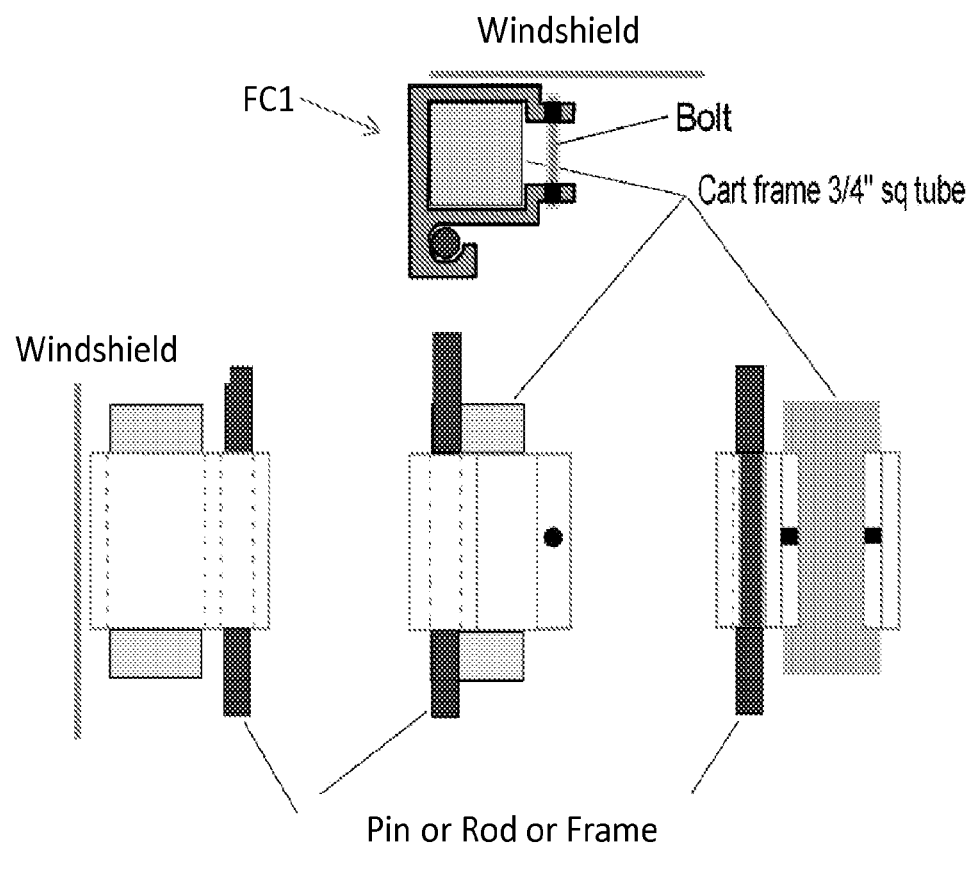
FIG. 24 illustrates an alternative connector for connecting the cart doors to the vehicle framed.

In still another non-limiting embodiment illustrated in FIG. 24, a hinge D, e.g., formed of plastic, can be connectable to the vehicle frame can be positioned around the vehicle frame and secured in place with a bolt, screw, clamp, clip or similar connection element. Hinge D can have a clip or channel to receive the pin or rod of the door frame, e.g., through a snap connection. Moreover, as this hinge D provides secure coupling of the vehicle doors to the frame without marring the frame, it can be particularly advantageous for connecting the vehicle doors to a rental vehicle.

Returning again to FIG. 1, side panel 2 can be provided for additional coverage and protection of the driver from inclement weather, wind, sun, etc. In particular, a skin for side panel 2 can be formed in a manner similar to the skin for doors 1. The door frame can be sized for use with a particular vehicle. By way of non-limiting example, when the vehicle is a golf cart, the skin for side panel 2 can have a length of 60 to 65 inches, preferably about 62.5 inches, and a width of 16 to 21 inches, preferably about 18 inches. In contrast to the cart doors 1, a side panel 2 can be connected to the vehicle without a frame. As shown in FIG. 18, top slots about 3 to 5 inches below a top surface of side panel 2 and bottom slots about ¾ to 1 inch below the top slots can be formed to receive a connecting strap V1 connectable to itself via, e.g., a loop and hook material, Velcro, snaps, hooks, etc. Connecting strap V1 can also be guided to surround a handle commonly formed in the canopy of vehicles. As the top slots are located below the top surface of side panel 2, a tail remains to cover the handle opening so rain will be channeled along the outer surface of side panel 2 to prevent rain from entering the vehicle. In embodiments, the tail may be formed of different and more rigid material than the skin so that the tail maintains its shape channel rain away from an interior of the cart. In the event the cart does not include a handle opening in the canopy, a connector, e.g., Velcro, snaps, etc., can be attached to a top of the canopy and a complementary connector can be attached to a top of the side panel for attaching side panel 2 to the vehicle canopy.

Further, to stabilize side panel 2, two more slots may be provided to receive another connecting strap connectable to itself via, e.g., a loop and hook material, Velcro, snaps, hooks, etc. This another connecting strap can be arranged in a lower part of side panel 2 and toward a front of side panel 2 so that it can be guided to surround a portion of a handle located on a side of the vehicle or at a side edge of the vehicle seat, e.g., a horizontal portion. Still further, two further slots can be provided to receive a further connecting strap connectable to itself via, e.g., a loop and hook material, Velcro, snaps, hooks, etc. This further connecting strap may be arranged in a lower part of side panel 2 and in an interior region of side panel 2 so that it can be guided to surround a portion of a handle located on a side of the vehicle or at a side edge of the vehicle seat, e.g., a vertical portion.

Referring again to FIG. 4, the location of the connecting straps in FIG. 18 are shown in relation to the handles on the canopy and on the side of cart or seat for securing side panel 2. Further, as shown in FIG. 4, a further slot can be provided in the vertical top panel 16 to receive a connecting strap connectable to itself via, e.g., a loop and hook material, Velcro, snaps, hooks, etc., in order to secure the vehicle door 1 in a closed position. Further, this connecting strap can be arranged to be guided to surround a portion of a handle located on a side of the vehicle or at a side edge of the vehicle seat, e.g., a diagonal portion, as shown in FIG. 4.

It is further contemplated that side panels 2 can be formed over a frame (not shown) to provide additional stability to the side panels 2. It may be advantageous to at least provide a portion of a frame or support panel at a top of side panel 2 in a region of the top slots to reduce stress on these slots. In particular, at least slots corresponding to the top slots can be provide in a support panel or in a vicinity of a frame portion, e.g., located just above or even with the top slots, so that the weight of side panel 2 is borne by the frame or support panel rather than the top slots. It is further contemplated that side panel 2 can include frame or support panel portions extending along one or both of the side edges for added stability. In particular, a frame member or support panel along a front edge of side panel 2 can reduce flapping of the front edge as the cart is driven. It is also understood that a bottom frame or support panel portion can be arranged at the bottom of side panel 1 for still further support and stability.

Figure 19:
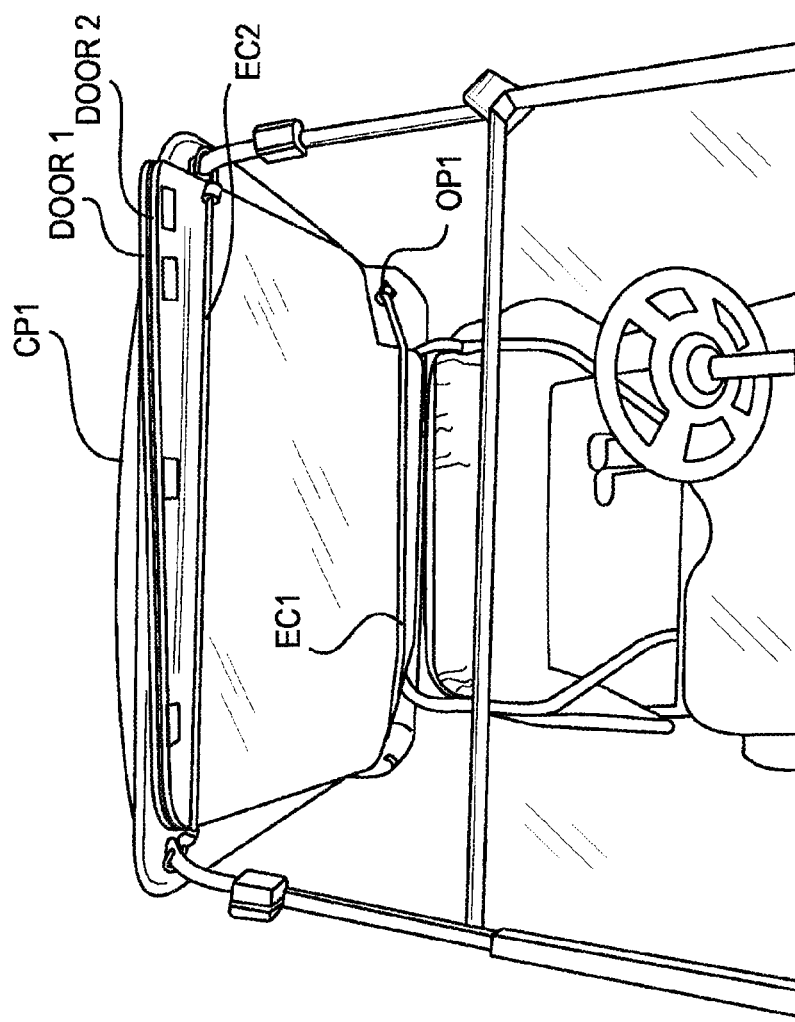
FIGS. 19 and 20 show the vehicle doors stowed under the canopy.
Figure 20:
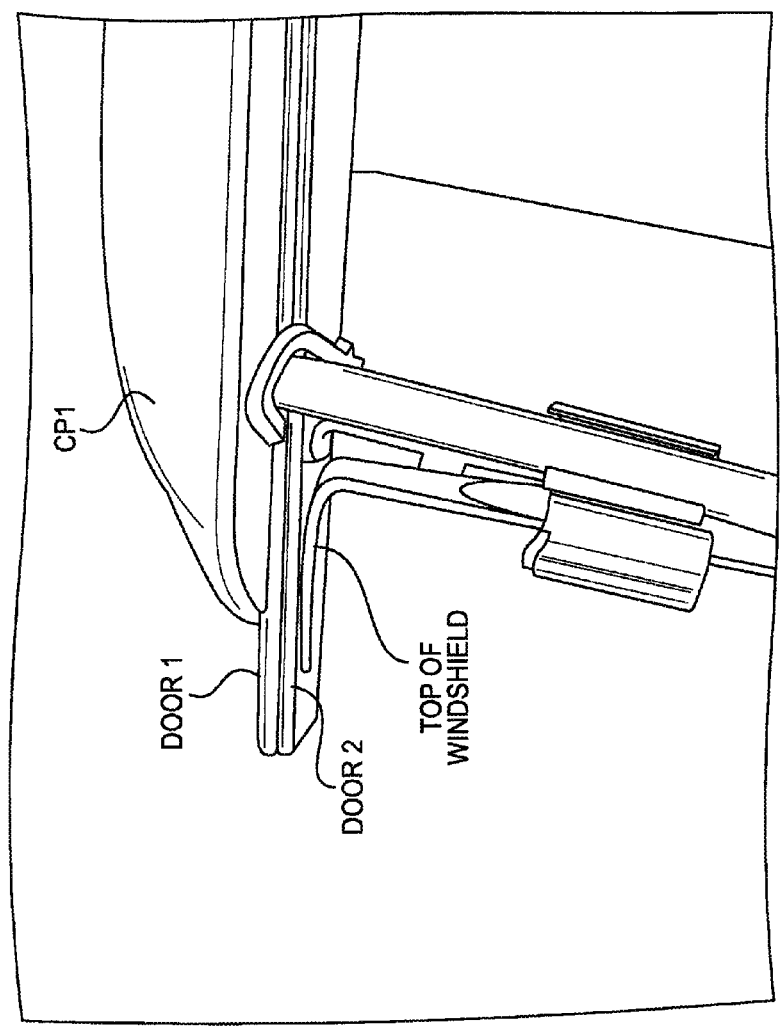

The doors according to the embodiments of the invention can be used only temporarily, e.g., during inclement weather conditions. When the inclement weather ends and the rider decides that the door are no longer necessary, the doors (as well as the side panels) can be removed from the frame by disconnecting the cart doors from their respective connection elements, e.g., U-shaped clips, C-shaped clamps, etc. When a vehicle driver decides to remove the doors while the driver is away from home, e.g., on the golf course, embodiments of the invention are directed to stowing the doors in the vehicle. In exemplary embodiments depicted in FIGS. 19 and 20, the removed vehicle doors can be stored under the top or canopy of the cart. By way of non-limiting example, elastic cords EC1, EC2, such as bungee cords, can be stretched across the vehicle frame underneath the canopy CP1 to provide a receiving channel for the removed doors. In particular, elastic cord EC1 located in the rear of the cart can be stretched on the underside of the canopy CP1 and between the handle openings OP1 in the canopy CP1. Another elastic cord EC2 can be stretched between the front two frame pieces to support the doors on the front end of the cart. In this manner, underneath support can be provided so that both doors (door1 and door2) can be stacked for storage under the canopy, as shown in FIG. 20. Further, as shown in FIG. 20, it may be advantageous to construct the frame to be thin enough so that the stacked doors can be stowed under the canopy CP1 but above the top of the windshield.

In order to ensure that the doors can be stowed under the canopy, the doors should be dimensioned so that the door frame is not wider than the vehicle's canopy. As the length of the vehicle that would be desired for covering, e.g., in the event of inclement weather, is generally greater than the width of the vehicle, and therefore the width of the canopy, according to embodiments, the vehicle door 1 is dimensioned to fit under the canopy, and removably attachable side panels 2 can be provided to cover the remaining length of the vehicle. As discussed above, side panels 2 can be framed skins similar to the doors or can be sheets of the skin material. As side panels 2 can be affixed at the top and bottom to the vehicle, e.g., via Velcro or snaps or other suitable connection, these side panels 2 are easily removed and stowed under the canopy with the doors 1. Further, by stowing the doors 1 in this manner, the side panels 2 are thin enough that they can be stowed with the doors 1, so that the windshield will still open and shut normally. Further, when stowed, the doors 1 and side panels 2 are out of the sun while not in use, which will save them from premature weathering, and the doors/side panels will be ready for use when needed. In accordance with the embodiments of the invention, doors 1 and side panels 2 can be easily stowed and/or installed in minutes.

Figure 21:
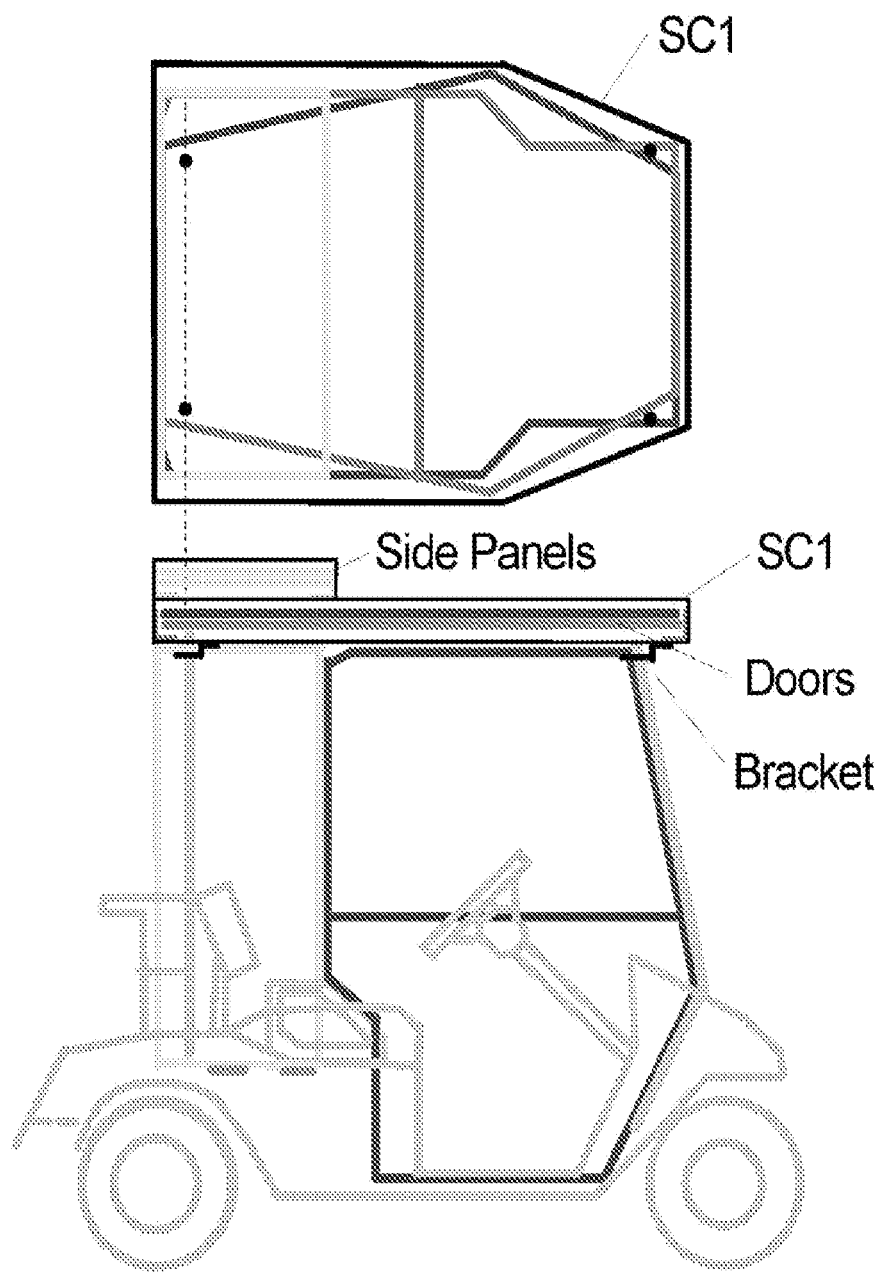
FIGS. 21 and 22 illustrate embodiments of a storage canopy having storage for receiving and stowing the doors and side panels within the canopy.
Figure 22:
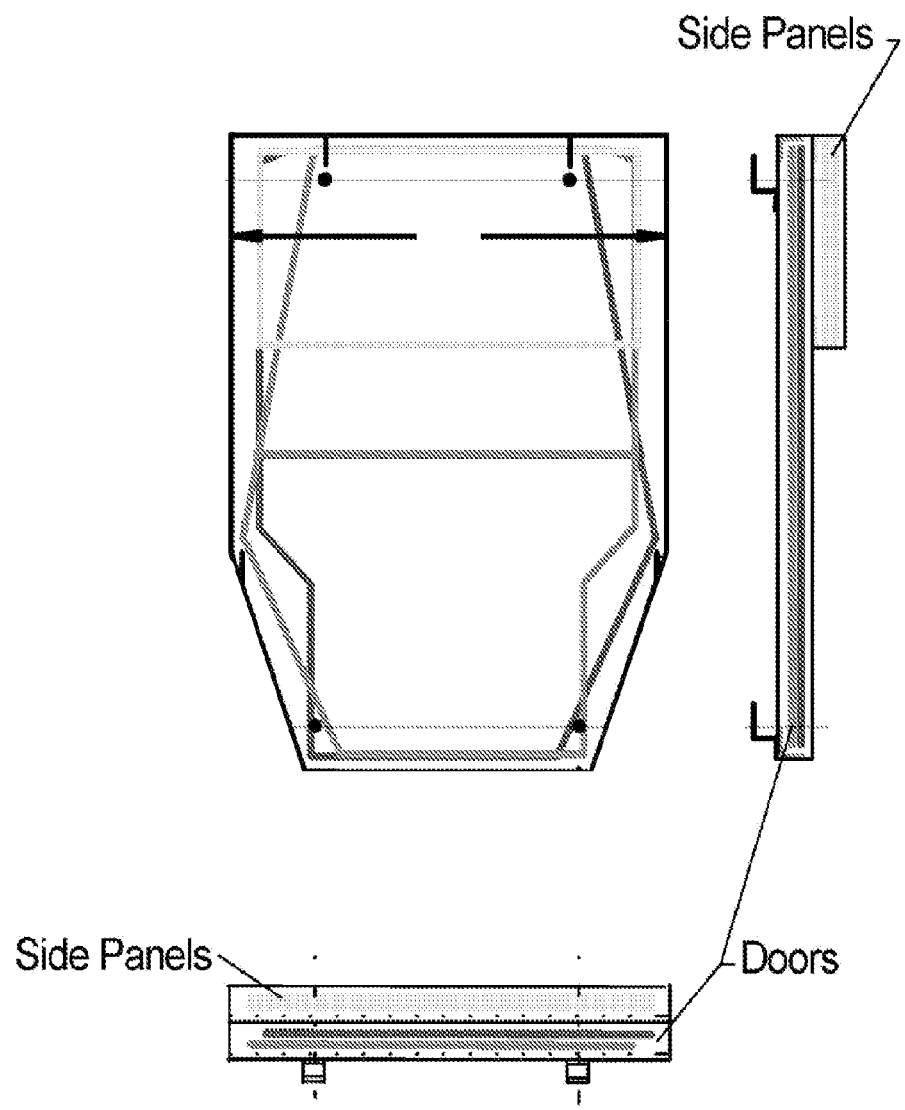

Moreover, in accordance other embodiments of the invention, the canopy of the vehicle can be replaced with a new storage canopy SC1, as depicted in FIGS. 21 and 22. In this regard, storage canopy SC1 can include storage space to receive and store doors 1 and side panels 1, and this storage space can be accessible through one of the sides or from the rear of the vehicle so that doors 1 and side panels 2 can be slidably inserted into the storage space. The drawing shows right and left doors 1 within the storage space in the stowed position, as well as side panels 2. Storage canopy SC2 also includes brackets located in positions that correspond to the canopy mounting holes of the vehicle's frame, so that storage canopy SC1 can be easily attached by screw, bolts, etc., to the current cart frame. Storage canopy SC1 can be manufactured of light weight steel, aluminum, composite material, fiberglass, or other formed material. Alternatively, storage canopy SC1 can be framed using the above-noted materials, and an outer skin can be attached to the frame. The outer skin may be attached to the frame via screws, bolts, Velcro, snaps, etc. Moreover, a flap or cover may be provided to close the storage space.

In other embodiments, it is understood that some vehicles already have predrilled holes in the vehicle frame. By way of non-limiting example, the frame of an EZ-GO vehicle has two predrilled holes that are ¼" in diameter. The top hole on both sides of the frame is approximately 5¼" from the top. This hole can be used for purposes of positioning the clips or brackets for connecting the doors 1 to the vehicle frame. Again, by non-limiting example, a screw or bolt can be inserted through the predrilled holes of the vehicle, so that the clips or brackets attached to the frame can be anchored in place with a screw or bolt extending through the clip or bracket for connection with a nut, thumb nut, etc. located on an opposite side of the frame in order to increase stability and avoid slippage of the clips or brackets. A lower existing hole in the known vehicle frame, which may be used by a window placed on the cart, by replacing the existing locknut with a thumb nut, a lower bracket attached to a connection piece can be attached.

Figure 23:
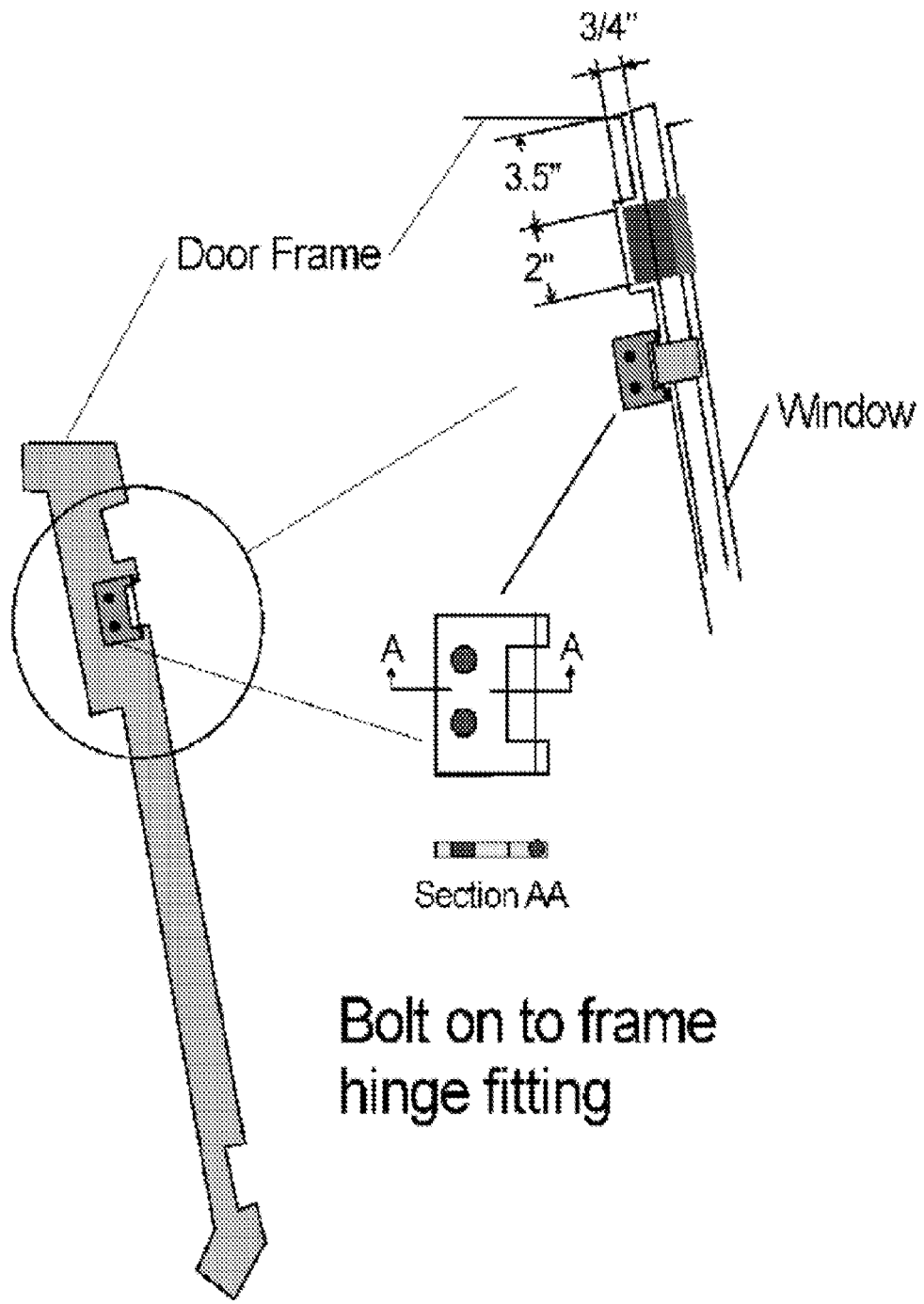
FIG. 23 illustrates an alternative connector for connecting the cart doors to the vehicle frame.

In a further embodiment of FIG. 23, a bolt onto frame hinge is illustrated for use in conjunction with the above-described clips A, B or C or bracket B1. In this embodiment, a part of the frame hinge which receives a hinge pin is anchored to the frame, e.g., via bolts, screws, spring clips, clamps, etc., and the pin can be placed into the small channels of the clips or brackets to mount the doors to the vehicle frame.

In a further embodiment of FIG. 24, in lieu of the above-described clips A, B or C or bracket B1, a further snap hinge D can be provided for ease of attachment of the door frame to the vehicle frame. In particular, like clip B, the large and smaller channels are oriented in the same direction. However, for additional security, hinge D includes extensions on the ends of the arms for surrounding the vehicle frame that can be joined with a bolt. Because it is clamped to the cart frame, no drilling or screwing into the cart frame is required. In operation, the large square opening surrounds the cart frame, while the smaller square captures the door frame. Moreover, it may be advantageous to coat an interior of the large square with a slip resistant coating to prevent slippage of hinge D under the weight of the cart doors 1.

In still other embodiments, a further connector can be provided for attaching cart door 1 to the cart frame. Further connector, which includes a hinge, e.g., a scissor hinge, that can be constructed of metal, plastic, etc. Because it is clamped to the cart frame, no drilling or screwing into the cart frame is required. In operation, the large square opening surrounds the cart frame, while the smaller square captures the door frame. Thus, in the manner of a scissors, as the large square is closed around the cart frame, the smaller square closes around the door frame so that the door can be added or removed from the scissor hinge without screws or the like. Moreover, it may be advantageous to coat an interior of the large square with a slip resistant coating to prevent slippage of further connector under the weight of the cart doors 1.

In other embodiments, the frame can be constructed of flexible fiberglass or composite material rods, and the skin can be sewn around the periphery of the frame. In such an embodiment, the frame can be twisted so that the flexible fiberglass or composite material rods bend and twist into a compact configuration for storage, and when desired, the rods can be untwisted and straightened to open the door frame for attachment to the vehicle frame in accordance with other the embodiments of the invention.

Advantages to various embodiments of the door system according to the invention:

The doors are light weight;
The doors are simple and not over designed;
Most replacement parts can be purchased at local hardware stores;
The clear plastic vinyl on the doors can be easily replaced in minutes;
Skins of the doors can be custom made for displaying names, favorite teams, etc.;
The frames can be made of solid material steel or stainless steel;
The frames can be made of plastic or PVC panels;
Some brackets used to hold the door frame are inexpensive and can be obtained from local hardware stores or shelving dealers;
The snaps are installed by installing only 4 screws; and
The system to hold the door under the frame is done by using bungee cords which can be easily purchased at a number of places.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A door system for a vehicle, comprising:
a door frame formed by at least one framing member;
a skin extending across the door frame;

a connection element coupled to the door frame to removably attach the door frame to a frame of the vehicle; and a pin coupled to the door frame, wherein the connection element comprises:

at least one of a clip, clamp or bracket structured for removable attachment to the frame of the vehicle, and a channel, comprised of two coaxial channels structured and arranged to receive and retain the pin, the two coaxial channels having pin receiving openings that are not aligned in an axial direction, wherein the door frame is dimensioned so that, when removed from the vehicle frame, the door frame stowable one of under and within a canopy of the vehicle.

2. The door system according to claim 1, further comprising a diagonal channel formed between the two coaxial channels.

3. A door system kit for a vehicle, comprising:

a plurality of frame pieces being connectable to one another for forming a door frame;

a skin structured and arranged to be extended over and attach at least one of to and around the door frame; and connection elements coupleable to the door frame and to a vehicle frame, the connection elements being removably attachable to each other, a pin coupled to the door frame, wherein the connection elements comprise:

at least one of clips, clamps or brackets structured for removable attachment to the frame of the vehicle, and channels, comprised of two coaxial channels structured and arranged to receive and retain the pin, the two coaxial channels having pin receiving openings that are not aligned in an axial direction, wherein the door frame is dimensioned to be stowable one of under and within a canopy of the vehicle.

4. The door system kit according to claim 3, further comprising a diagonal channel formed between the two coaxial channels.

5. A door system for a vehicle, comprising:

a door frame formed by at least one framing member;

a skin extending across the door frame; and a connection element comprising at least one of a clip, clamp or bracket structured for removable attachment to a frame of the vehicle, which is connectable to a hinge pin that is one of integral with and attached to the door frame to removably attach the door frame to the frame of the vehicle, wherein the door frame is dimensioned so that, when removed from the frame of the vehicle, the door frame is stowable one of under and within a canopy of the vehicle and wherein the connection element further comprises two coaxial channels structured and arranged to receive and retain the hinge pin, and wherein the two coaxial channels have hinge pin receiving openings that are not aligned in an axial direction.

* * * * *